US012795210B2

(12) United States Patent
Park

(10) Patent No.: US 12,795,210 B2
(45) Date of Patent: Nov. 10, 2026

(54) ELECTRONIC DEVICE AND OPERATING METHOD THEREOF

(71) Applicant: SAMSUNG ELECTRONICS CO., LTD., Suwon-si (KR)

(72) Inventor: Jaesung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/272,295

(22) Filed: Jul. 17, 2025

(65) Prior Publication Data

US 2026/0122320 A1 Apr. 30, 2026

Related U.S. Application Data

(63) Continuation of application No. PCT/KR2025/009699, filed on Jul. 7, 2025.

(30) Foreign Application Priority Data

Oct. 31, 2024 (KR) ........................ 10-2024-0152960

(51) Int. Cl.

| | |
|---|---|
| ***H04N 21/488*** | (2011.01) |
| ***H04N 21/44*** | (2011.01) |
| ***H04N 21/466*** | (2011.01) |

(52) U.S. Cl.
CPC ......... *H04N 21/4882* (2013.01); *H04N 21/44* (2013.01); *H04N 21/466* (2013.01)

(58) Field of Classification Search
None
See application file for complete search history.

(56) References Cited

U.S. PATENT DOCUMENTS 8,019,571 B2 9/2011 Ban et al.
8,787,727 B2 7/2014 Park et al.
(Continued)

FOREIGN PATENT DOCUMENTS

CN 112422733 A 2/2021
EP 2 731 322 A1 5/2014
(Continued)

OTHER PUBLICATIONS

International Search Report and Written Opinion (PCT/ISA/220, PCT/ISA/210, and PCT/ISA/237) dated Oct. 20, 2025 issued by the International Searching Authority in International Application No. PCT/KR2025/009699.

*Primary Examiner* — Junior O Mendoza
(74) *Attorney, Agent, or Firm* — Sughrue Mion, PLLC

(57) ABSTRACT

An electronic device includes a processor; and memory storing one or more instructions, wherein the one or more instructions, when executed, cause the electronic device to receive a notification message while content is displayed; determine a priority of the notification message based on a first machine learning model that uses a response history of a user for notification messages; obtain a predicted level of immersion by obtaining content information about the content, and inputting the content information into a second machine learning model trained to obtain a predicted level of immersion of the user based on input information about content being played; determine a first notification time and a first notification method based on the priority and the predicted level of immersion; and trigger a notification for the notification message according to the notification time and the notification method.

20 Claims, 21 Drawing Sheets

(56) References Cited

U.S. PATENT DOCUMENTS

| | | | | |
|---|---|---|---|---|
| 12,229,656 | B2 | 2/2025 | Choi et al. | |
| 2007/0044120 | A1 | 2/2007 | Lee | |
| 2020/0099645 | A1 | 3/2020 | Aggarwal et al. | |
| 2021/0216815 | A1 | 7/2021 | Lee | |
| 2023/0336804 | A1 * | 10/2023 | Welch | H04N 21/262 |
| 2023/0381649 | A1 * | 11/2023 | Karp | A63F 13/212 |
| 2025/0087373 | A1 | 3/2025 | Singh | |
| 2025/0094878 | A1 * | 3/2025 | Rivlin | G06N 3/08 |
| 2026/0164081 | A1 * | 6/2026 | Gupta | H04N 21/4316 |

FOREIGN PATENT DOCUMENTS

| | | | |
|---|---|---|---|
| JP | 2005-167343 | A | 6/2005 |
| JP | 6955034 | B2 | 10/2021 |
| KR | 10-2006-0004697 | A | 1/2006 |
| KR | 10-0661650 | B1 | 12/2006 |
| KR | 10-2012-0060570 | A | 6/2012 |
| KR | 10-1533280 | B1 | 7/2015 |
| KR | 10-2021-0091584 | A | 7/2021 |
| KR | 10-2022-0071677 | A | 5/2022 |
| KR | 10-2022-0157421 | A | 11/2022 |
| KR | 10-2570343 | B1 | 8/2023 |
| KR | 10-2023-0143813 | A | 10/2023 |
| KR | 10-2023-0169602 | A | 12/2023 |
| KR | 10-2641927 | B1 | 2/2024 |

* cited by examiner

FIG. 2A
[DISHWASHER]
WASHING COMPLETE

ELECTRONIC DEVICE AND OPERATING METHOD THEREOF

CROSS-REFERENCE TO RELATED APPLICATIONS

This application is a by-pass continuation application of International Application No. PCT/KR2025/009699, filed on Jul. 7, 2025, which is based on and claims priority to Korean Patent Application No. 10-2024-0152960, filed on Oct. 31, 2024, in the Korean Intellectual Property Office, the disclosures of which are incorporated by reference herein in their entireties.

BACKGROUND

1. Field

The disclosure relates to an electronic device and an operating method of the electronic device, and in particular, an electronic device, which may determine a timing and method of triggering a notification for a notification message based on a determined priority of the notification message and the user's level of immersion with respect to the content, and an operating method of the electronic device.

2. Description of Related Art

As the use of digital devices in daily life increases, notification messages received from the digital devices also increase. However, determining whether the notification messages are noise may be difficult. Notification messages may sometimes provide important information to the user in a timely manner, but sometimes they may also interrupt the immersion with respect to the content being viewed or may cause stress. Therefore, there is a need for the development of technologies that may filter notification messages to the user based on the user's electronic device usage patterns, for example.

SUMMARY

According to an aspect of the disclosure, an electronic device includes at least one processor; and memory storing one or more instructions, wherein the one or more instructions, when executed by the at least one processor individually or collectively, cause the electronic device to receive a notification message while first content is displayed; determine a priority of the notification message by using a first machine learning model trained to output a determined priority of an input notification message based on a response history of a user with respect to one or more notification messages corresponding to the input notification message; obtain a predicted level of immersion of the user with respect to the first content by obtaining first content information about the first content; and inputting the first content information into a second machine learning model trained to obtain a predicted level of immersion of the user with respect to content being played based on input information about content being played; determine a first notification time and a first notification method of the notification message based on the priority and the predicted level of immersion; and trigger a first notification for the notification message according to the first notification time and the first notification method.

The one or more instructions, when executed by the at least one processor individually or collectively, may cause the electronic device to classify the notification message; store the notification message without notification based on the notification message being classified as a first type; trigger the first notification at a first time based on the predicted level of immersion being classified as a low and the notification message being classified as a second type; and trigger the first notification based on the notification message being classified as a third type.

The notification message may be classified as the first type, and the one or more instructions, when executed by the at least one processor individually or collectively, may cause the electronic device to combine the notification message with a previously stored message without notification based on the previously stored message being stored without notification to generate a first combined message, and store the first combined message; and combine the notification message with a previously stored combined message based on the previously stored combined message being stored without notification to generate a second combined message, and store the second combined message.

A second priority of the second combined message may be greater than or equal to a first priority of the first combined message, and the first priority may be greater than or equal to a third priority of the notification message.

The one or more instructions, when executed by the at least one processor individually or collectively, may cause the electronic device to determine the first priority by using the first machine learning model based on the first combined message being generated; determine a second notification time and a second notification method of the first combined message based on the first priority and the predicted level of immersion; and trigger a second notification for the first combined message based on the second notification time and the second notification method.

The one or more instructions, when executed by the at least one processor individually or collectively, may cause the electronic device to update both the first machine learning model and the second machine learning model based on user feedback with respect to the first notification.

Both the first machine learning model and the second machine learning model may be trained on a server.

The first notification method may include at least one of combining a plurality of notification messages and triggering a single message notification, triggering a pop-up notification, triggering a text bar notification, storing a notification message without notification, triggering a voice output notification, or requesting feedback from the user based on triggering a notification.

The second machine learning model may be trained to predict a level of immersion with respect to content based on input information about the content and context information of the user, and the one or more instructions, when executed by the at least one processor individually or collectively, may cause the electronic device to obtain the predicted level of immersion based on obtaining the first content information and first context information of the user and inputting the first content information and the first context information into the second machine learning model.

The first content information may include at least one of type information, genre information, motion analysis information, color analysis information, running time information, or playback information of the user.

According to an aspect of the disclosure, an operating method of an electronic device includes receiving a notification message while first content is displayed; determining a priority of the notification message by using a first machine learning model trained to output a determined priority of an input notification message based on a response history of a user with respect to one or more notification messages corresponding to the input notification message; obtaining a predicted level of immersion of the user with respect to the first content by obtaining first content information about the first content and inputting the first content information into a second machine learning model trained to obtain a predicted level of immersion of the user with respect to content being played based on input information about content being played; determining a first notification time and a first notification method of the notification message based on the priority and the predicted level of immersion; and triggering a first notification for the notification message according to the first notification time and the first notification method.

The operating determining of the notification time and the notification method of the notification message may include classifying the notification message; storing the notification message without notification based on the notification message being classified as a first type; triggering the first notification at a first time based on the predicted level of immersion being classified as low and the notification message being classified as a second type; and triggering the first notification based on the notification message being classified as a third type.

The operating notification message may be classified as the first type, and the storing the notification message may include combining the notification message with a previously stored message without notification based on the previously stored message being stored without notification to generate a first combined message, and storing the first combined message; and combining the notification message with a previously stored combined message based on the previously stored combined message being stored without notification to generate a second combined message, and storing the second combined message.

A second priority of the second combined message may be greater than or equal to a first priority of the first combined message, and the first priority may be greater than or equal to a third priority of the notification message.

The operating method may further include determining the first priority by using the first machine learning model based on the first combined message being generated; determining a second notification time and a second notification method of the first combined message based on the first priority and the predicted level of immersion; and triggering a second notification for the first combined message based on the second notification time and the second notification method.

The operating method may further include updating both the first machine learning model and the second machine learning model based on user feedback with respect to the first notification.

Both the first machine learning model and the second machine learning model may be trained on a server.

The first notification method may include at least one of combining a plurality of notification messages and triggering a single message notification, triggering a pop-up notification, triggering a text bar notification, storing the notification message without notification, triggering a voice output notification, or requesting feedback from the user based on triggering a notification.

The second machine learning model may be trained to predict a level of immersion with respect to content based on input information about the content and context information of the user, and wherein the operating method may further include obtaining the predicted level of immersion based on obtaining the first content information and first context information of the user and inputting the first content information and the first context information into the second machine learning model.

According to an aspect of the disclosure, a non-transitory computer-readable recording medium having instructions recorded thereon, that, when executed by one or more processors, individually or collectively, cause the one or more processors to receive a notification message while first content is displayed; determine a priority of the notification message by using a first machine learning model trained to output a determined priority of an input notification message based on a response history of a user with respect to one or more notification messages corresponding to the input notification message; obtain a predicted level of immersion of the user with respect to the first content by obtaining first content information about the first content and inputting the first content information into a second machine learning model trained to obtain a predicted level of immersion of the user with respect to content being played based on input information about content being played; determine a first notification time and a first notification method of the notification message based on the priority and the predicted level of immersion; and trigger a first notification for the notification message according to the first notification time and the first notification method.

BRIEF DESCRIPTION OF THE DRAWINGS

The above and other aspects, features, and advantages of certain embodiments of the present disclosure are more apparent from the following description taken in conjunction with the accompanying drawings, in which.

DETAILED DESCRIPTION

Figure 1:
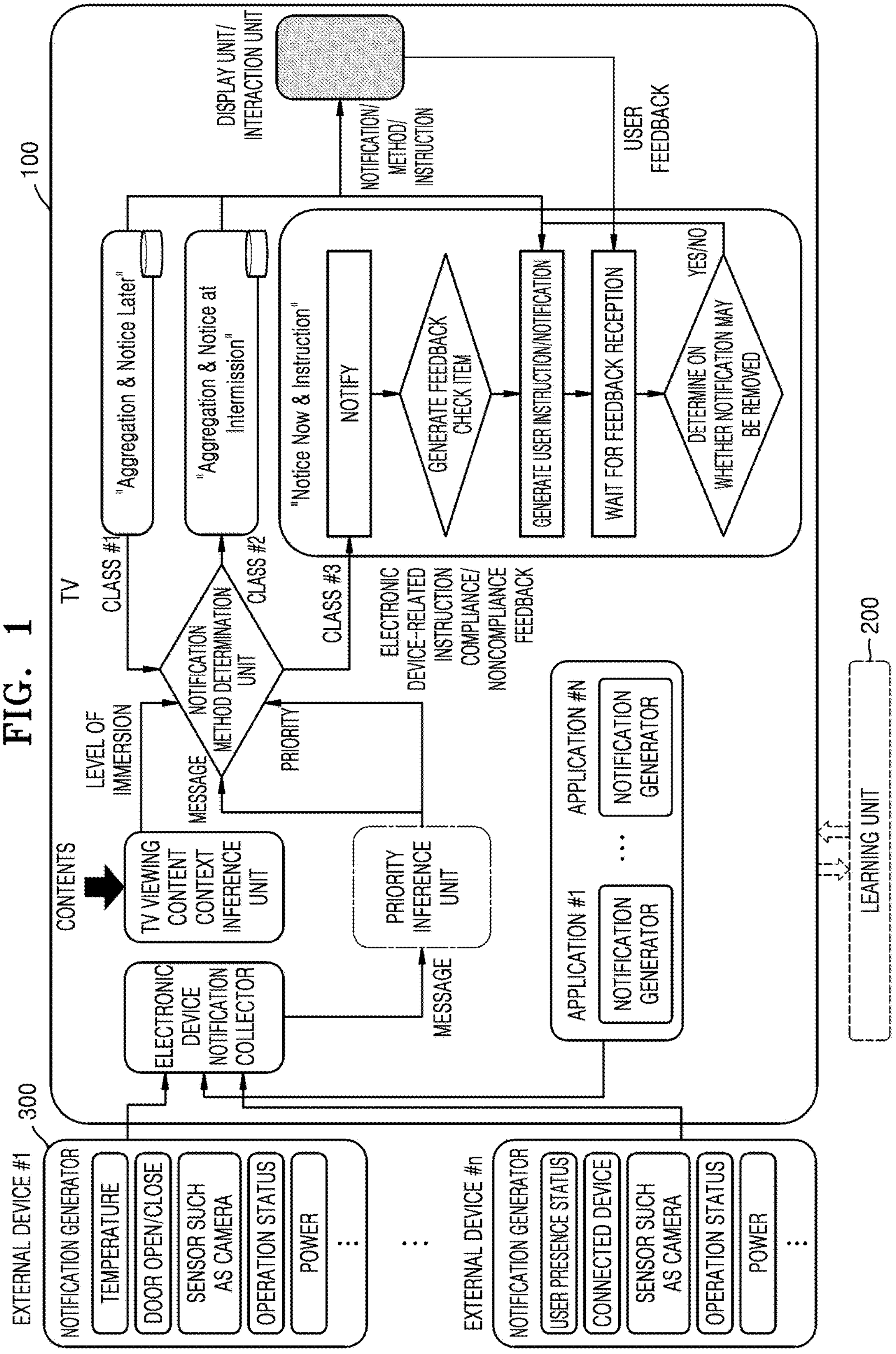
FIG. 1 is a diagram showing an example in which an electronic device operates, according to an embodiment of the disclosure.

Embodiments of the disclosure are described in detail herein with reference to the accompanying drawings so that this disclosure may be performed by one of ordinary skill in the art to which the disclosure pertains. The disclosure may, be embodied in many different forms and should not be construed as being limited to the examples set forth herein.

Although terms widely used at present were selected for describing the disclosure in consideration of the functions thereof, these terms may vary according to intentions of one of ordinary skill in the art, case precedents, the advent of new technologies, or the like. Hence, the terms must be defined based on their meanings and the contents of the entire specification, not by stating the terms.

The terms used in the present specification are used to describe particular embodiments of the disclosure, and are not intended to limit the scope of the disclosure.

Throughout the disclosure, when an element is referred to as being "connected" or "coupled" to another element, it can be directly connected or coupled to the other element, or can be electrically connected or coupled to the other element with intervening elements interposed therebetween.

The use of the terms "a" and "an" and "the" and similar referents in the context of describing the disclosure (in the context of the following claims) are to be construed to cover both the singular and the plural. The steps of all methods described herein can be performed in any order unless otherwise indicated herein or otherwise clearly contradicted by context. Embodiments of the disclosure are not limited to the described order of the operations.

The expression "according to an embodiment" used in the entire disclosure does not necessarily indicate the same embodiment.

The words "mechanism," "element," "means," and "configuration" are used broadly and are not limited to mechanical or physical embodiments.

Embodiments of the disclosure may be described in terms of functional block components and various processing steps.

The connecting lines or connectors between components shown in the various figures presented are intended to represent exemplary functional relationships and/or physical or logical couplings between the components. In an actual device, a connection between components may be represented by various functional connections, physical connections, or circuit connections that are replaceable or added.

The terms "unit," " . . . er ( . . . or)," and "module" when used in the disclosure refers to a unit in which at least one function or operation is performed, and may be implemented as hardware, software, or a combination of hardware and software.

The expression "configured to" as used in the disclosure may be used interchangeably with, for example, "suitable for," "having the capacity to," "designed to," "adapted to," "made to," or "capable of". The term "configured to" may not necessarily mean "specifically designed to" in hardware. Instead, in some contexts, the expression "a system configured to" may mean that the system is "capable of" doing something together with other devices or components For example, the phrase "a processor configured to perform A, B, and C" may mean a dedicated processor (e.g., an embedded processor) for performing the operations, a central processing processor (CPU), or an application processor (AP), for example, that may perform the operations by executing one or more software programs stored in memory.

The term "user" may mean a person who controls a function or operation of an electronic device by using the electronic device.

The expression "at least one of A or B" or "at least one of A, or B" when used in the disclosure refers to including either A, B, or both A and B. The expression "at least one of a, b or c" when used in the disclosure refers to only a, only b, only c, both a and b, both a and c, both b and c, or all of a, b, and c.

Below, with reference to the attached drawings, embodiments of the disclosure are described in detail so that those of ordinary skill in the art may practice the embodiments.

Figure 2A:
FIG. 2A, FIG. 2B and FIG. 2C are diagrams showing examples of notification messages obtained from various external devices, according to an embodiment of the disclosure.
Figure 2B:
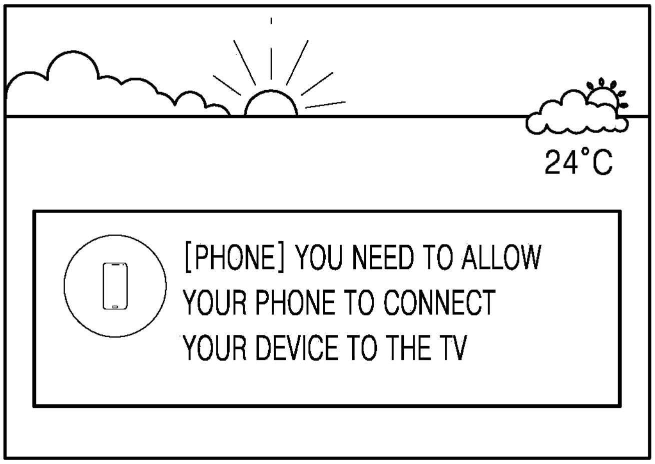
Figure 2C:
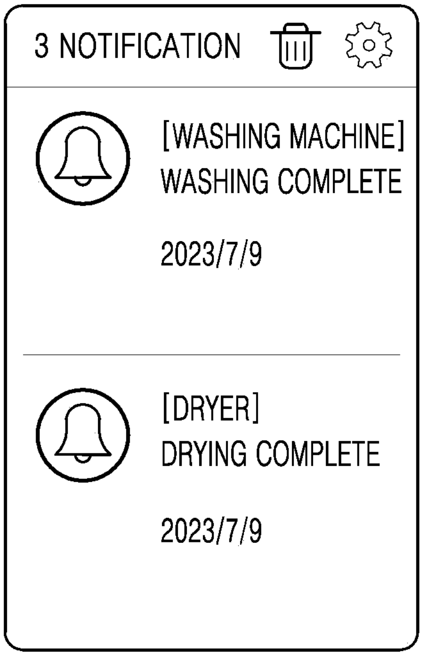
Figure 3:
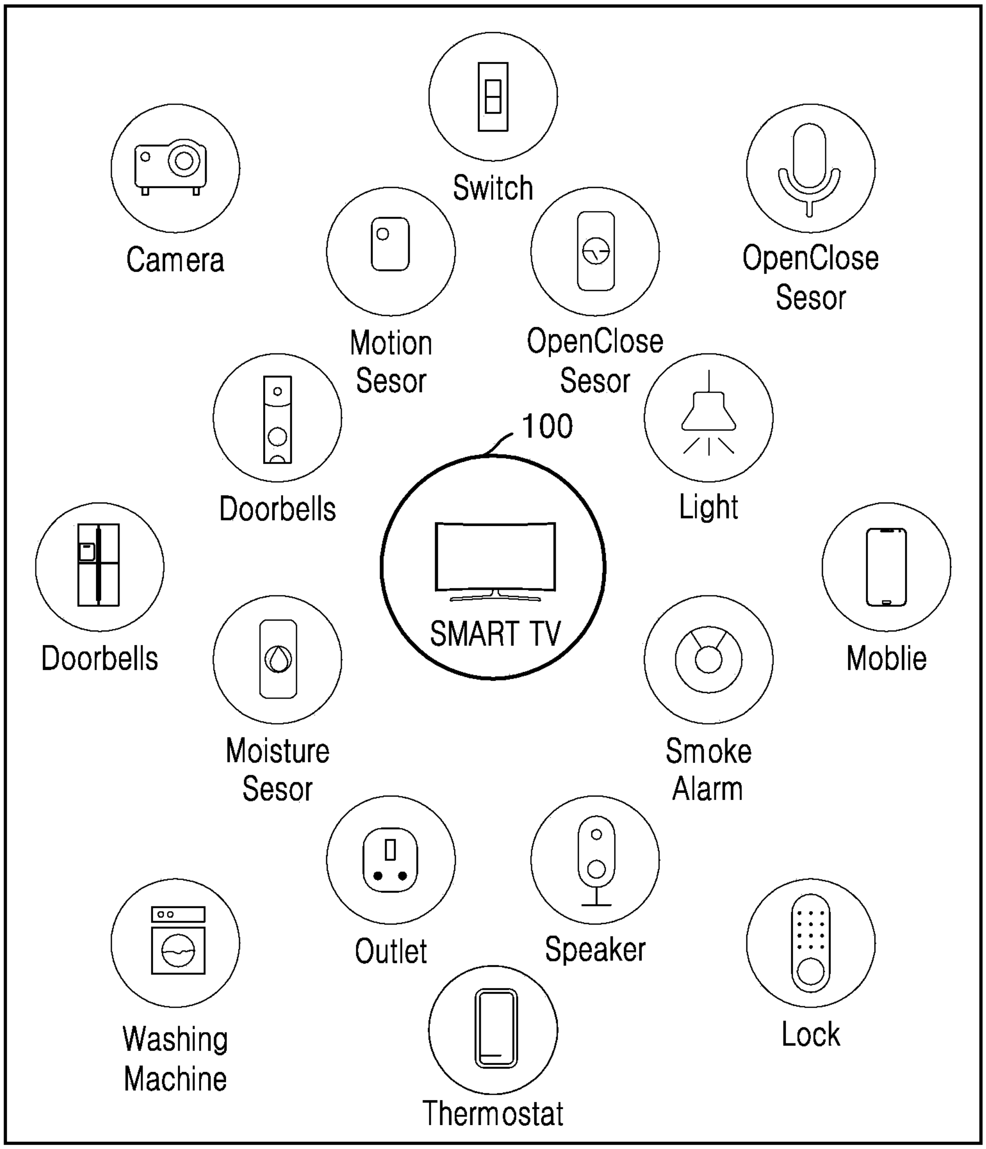
FIG. 3 is a diagram showing examples of various external devices that may transmit notification messages to an electronic device, according to an embodiment of the disclosure.

FIG. 1 is a diagram showing an example in which an electronic device operates, according to an embodiment of the disclosure, FIG. 2A, FIG. 2B and FIG. 2C are diagrams showing examples of notification messages obtained from various external devices, according to an embodiment of the disclosure, and FIG. 3 is a diagram showing examples of various external devices that may transmit notification messages to an electronic device, according to an embodiment of the disclosure.

According to an embodiment of the disclosure, an electronic device 100 may receive at least one notification message from at least one external device 300 including an external device #1 to an external device #n or at least one application installed in the electronic device 100 while content is being played.

A "notification message" may refer to all messages transmitted to a user of the electronic device 100 through the electronic device 100. The notification message may be received from the external device 300 or from an internal application or hardware, for example.

For example, the electronic device 100 may receive a message notifying completion of washing from an external device, such as a dishwasher, as shown in FIG. 2A, a connection-related notification message from an external device, such as a smartphone, as shown in FIG. 2B, or a message notifying completion of washing and completion of drying from external devices, such as a washing machine and a dryer, respectively, as shown in FIG. 2C.

The electronic device 100 may receive or obtain, as notification messages, all messages that may be output by at least one external device 300 or at least one application.

As shown in the embodiment of FIG. 1, the electronic device 100 may be a smart television (TV). This case is only an embodiment and the electronic device 100 may be implemented in various forms.

The electronic device 100 may be implemented as an electronic device including a large video output unit, such as a TV, but is not limited thereto. The electronic device 100 and the external device 300 may be fixed or mobile and may be digital broadcast receivers capable of receiving digital broadcasts.

According to an embodiment of the disclosure, the electronic device 100 may be implemented in the form of a device that performs image output as a part of its function while performing other functions.

The electronic device 100 and external device 300 according to an embodiment of the disclosure may be implemented in various forms, such as a tablet PC, a smartphone, a digital camera, a camcorder, a laptop computer, a smart TV, a netbook computer, a desktop, an e-book terminal, a video phone, a digital broadcasting terminal, a Personal Digital Assistant (PDA), a Portable Multimedia Player (PMP), a navigation device, a wearable device, a smart refrigerator, and other home appliances.

The electronic device 100 may have a built-in display, but is not limited thereto, and may be implemented in a form in which the electronic device 100 is connected to an external display and operates even without a built-in display.

For example, the electronic device 100 may be implemented in a form in which the electronic device 100 outputs images to a separate external display through a video or audio output port without a display or with a simple display for notifications, etc, such as an set-top-box (STB) or Apple TV.

The electronic device 100 may be equipped with an output port for outputting a video or audio signal to the display. The output port may be of a type that may simultaneously transmit a video signal and an audio signal, such as High-Definition Multimedia Interface (HDMI), or Display Port (DP), or may be of a type in which there are ports for separately transmitting a video signal and an audio signal.

According to an embodiment of the disclosure, the electronic device 100 may transmit a video or audio signal by wired communication or wireless communication, for example.

The electronic device 100 may be implemented as an electronic device having a flat display, as well as an electronic device having a curved display or a flexible electronic device whose curvature may be adjusted. The output resolution of the electronic device 100 may include, for example, High Definition (HD), Full HD, Ultra HD, or a resolution clearer than Ultra HD.

According to an embodiment of the disclosure, at least one external device 300 that may transmit a notification message to the electronic device 100 may include the electronic devices illustrated in FIG. 3.

The at least one external device 300 may include various electronic devices that may be used by the user of the electronic device 100.

The least one external device 300 may include portable devices, such as a smartphone and a smart pad, that may be used by the user of the electronic device 100.

The at least one external device 300 may include Internet of Things (IOT) devices around the electronic device 100, such as a camera, a switch, a motion sensor, a door sensor, a door bell, a light, a humidity sensor, a smoke detection sensor, a washing machine, a dishwasher, a speaker, a thermometer, various locking devices, a refrigerator, a cooker, and a socket.

The at least one external device 300 may include any electronic device that may be connected to and communicate with the electronic device 100 through a wired or wireless network, and is not limited to those described in the disclosure.

The electronic device 100 may obtain a notification message from the at least one external device 300 while playing content. Of at least one notification message received by the electronic device 100, the electronic device 100 may determine messages to be immediately confirmed, but there may also be messages that the electronic device 100 may determine are not to be immediately confirmed.

According to an embodiment of the disclosure, the electronic device 100 may classify the at least one received notification message and collect or store at least one notification message to determine an appropriate notification time and notification method for each classification.

According to an embodiment of the disclosure, the electronic device 100 may determine the third priority of the notification message. A method by which the electronic device 100 determines the third priority of the notification message will be described below with reference to FIGS. 6 and 7.

According to an embodiment of the disclosure, the electronic device 100 may infer the context of the content being played. According to an embodiment of the disclosure, the electronic device 100 may analyze information about the content being played and obtain a predicted level of immersion of the user with respect to the content being played. A method by which the electronic device 100 obtains a predicted level of immersion of a user with respect to the content being played will be described below with reference to FIGS. 8 and 9.

According to an embodiment of the disclosure, the electronic device 100 may determine a notification method of the notification message based on the priority of the notification message and the predicted level of immersion of the user with respect to the content being played.

According to an embodiment of the disclosure, the electronic device 100 may classify the notification method of the notification message into three types based on the priority of the notification message and the predicted level of immersion of the user with respect to the content being played. The first type is an "Aggregation and Notice later" type that generates a combined message and notifies at a later time, the second type is an "Aggregation and Notice at Intermission" type that generates a combined message and notifies at an intermission, and the third type is a "Notice Now and Instruction" type that immediately notifies and conveys a request to the user.

According to an embodiment of the disclosure, the first type may use a notification method that automatically accumulates and combines simple repetitive notification messages that the user determines are not to be prioritized and then notifies at once later. According to an embodiment of the disclosure, the electronic device 100 may, when notification messages are continuously accumulated but their priority is determined to be lower than the priority of viewing content, integrate the notification messages into a single notification and then notify the user of the single notification at once when the electronic device 100 is powered off.

According to an embodiment of the disclosure, the second type may be a notification method that accumulates and integrates notification messages whose priority is determined to be higher than the first type and relatively lower than the third type, and then displays the integrated notification messages on a screen at an intermission time when the user's viewing immersion level is predicted to decrease. The intermission time may be, for example, an advertisement time, a remote control operation time, or a program or channel change time.

According to an embodiment of the disclosure, when the notification message is determined to be of the third type with high priority, the electronic device 100 may immediately notify the user of the notification message, and when it is identified that user feedback may be used, the electronic device 100 may generate a user instruction or notification and additionally notify the user of the user instruction or notification. The electronic device 100 may determine whether to remove the initial notification message based on feedback received from the user. The feedback received from the user may be feedback with respect to whether to follow the additionally notified user instruction or notification. For example, when the user may immediately check the status of one of the external devices 300, the electronic device 100 may immediately display a message indicating this instruction and delete the message when feedback is obtained that the user has completed the instruction.

According to an embodiment of the disclosure, when it is detected that the user has not performed an additionally notified user instruction or notification, the electronic device 100 may determine that the initial notification message may not be removed. According to an embodiment of the disclosure, when the electronic device 100 determines that the initial notification message may not be removed, the electronic device 100 may generate the same user instruction or notification and re-notify the user of the generated same user instruction or notification. According to an embodiment of the disclosure, when the electronic device 100 determines that the initial notification message may not be removed, the electronic device 100 may draw the user's attention by re-notifying the notification message by adding an auditory effect or a visual effect thereto.

According to an embodiment of the disclosure, the electronic device 100 may trigger a first notification for the notification message according to the first notification time and the first notification method determined based on the priority of the notification message and the predicted level of immersion.

The notification method may include at least one of combining a plurality of notification messages and triggering a single message notification, triggering a pop-up notification, triggering a text bar notification, storing a notification message without notification, triggering a voice output notification, or requesting feedback from the user based on triggering a notification. These are examples and the notification method is not limited to those described above.

Generating a combined message by integrating a plurality of notification messages may not mean generating a message by combining all notification messages, but may mean generating a message by summarizing, omitting, or changing the message based on the context, or the relationship between messages.

According to an embodiment of the disclosure, the electronic device 100 may generate and train a first model used to determine the priority of a notification message by using a server 200 and a second model used to obtain a predicted level of immersion of a user with respect to the content being played.

The electronic device 100 may automatically determine the notification time and notification method of the notification message based on the a response history of a user with respect to one or more notification messages corresponding to the notification message and a predicted level of immersion of the user with respect to the content being played, thereby improving the user's content viewing environment by allowing the user to omit the cumbersome task of manually setting whether to notify for each application or external device 300 and of turning off a notification sound or changing a mode to a vibration mode.

According to an embodiment of the disclosure, the user may be identified based on an account logged in the electronic device 100.

According to an embodiment of the disclosure, the user may be identified by person recognition via a camera of the electronic device 100, iris recognition, person recognition based on motion feature analysis, or person recognition via voice analysis.

Figure 4A:
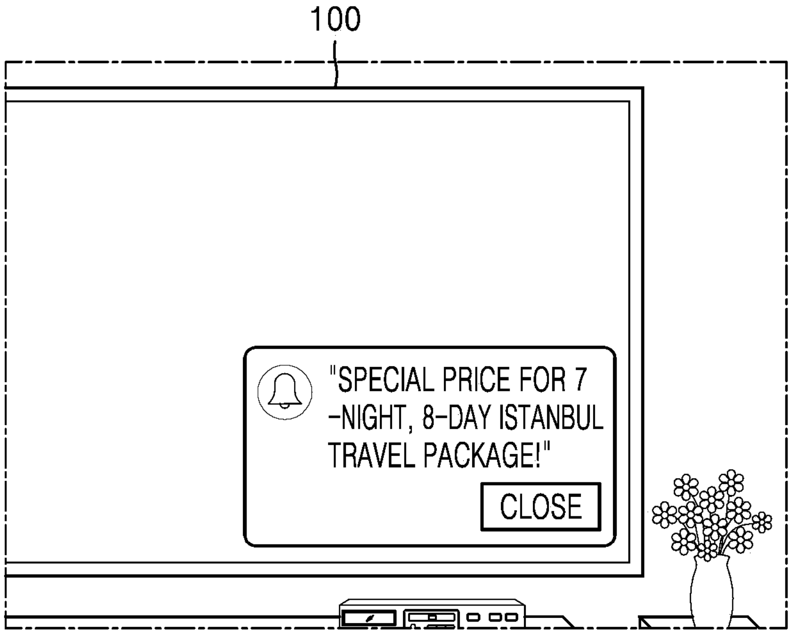
FIG. 4A and FIG. 4B are diagrams showing an example of a notification message according to an embodiment of the disclosure.
Figure 4B:
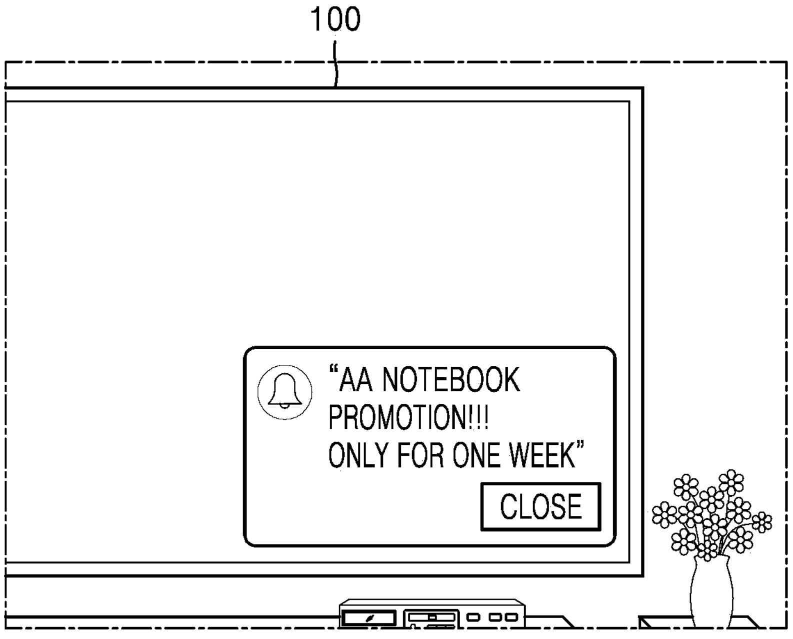

FIG. 4A and FIG. 4B are diagrams showing an example of a notification message according to an embodiment of the disclosure.

According to an embodiment of the disclosure, the notification message received by the electronic device 100 may be an advertisement message.

According to an embodiment of the disclosure, the notification message received by the electronic device 100 may include an advertisement message provided from at least one external device 300 or at least one application based on the content being played or the context of the user.

According to an embodiment of the disclosure, when the content being played is a travel entertainment program, the electronic device 100 may receive an advertisement message for a travel destination or a related travel destination introduced in the program from the at least one external device 300 or the advertisement application installed in the electronic device 100.

According to an embodiment of the disclosure, the advertisement message may be a travel advertisement message, such as "price for a 7-night, 8-day Istanbul travel package!", as shown in FIG. 4A.

According to an embodiment of the disclosure, the electronic device 100 may receive an advertisement message for a product included in the content being played or a product used by a performer of the content being played, or a similar product, from the at least one external device 300 or the advertising application installed in the electronic device 100.

According to an embodiment of the disclosure, the advertisement message may be a product advertisement message, such as "AA Notebook Promotion!!! For One Week", as shown in FIG. 4B.

According to an embodiment of the disclosure, the advertisement message may be an image including a video.

According to an embodiment of the disclosure, when a certain scene is repeatedly viewed or a gesture on which the user suddenly focuses is detected, the electronic device 100 may receive an advertisement message related to the scene from the at least one external device 300 or the advertising application installed in the electronic device 100.

The electronic device 100 according to an embodiment of the disclosure may determine the third priority of the advertisement message by using a first machine learning model trained to output the determined priority of the input advertisement message based on the response history of a user with respect to one or more notification messages corresponding to the advertisement message.

The electronic device 100 according to an embodiment of the disclosure may obtain the predicted level of immersion of the user with respect to the content being viewed by obtaining the first content information about the first content being viewed and inputting the first content information into a second machine learning model. The second machine learning model may be a model trained to obtain a predicted level of immersion of the user with respect to the content being played based on input information about the content being played.

The electronic device 100 according to an embodiment of the disclosure may determine a first notification time and a first notification method of an advertisement message based on the priority of the determined advertisement message and the predicted level of immersion.

The electronic device 100 according to an embodiment of the disclosure may determine a provision or display time of a received advertisement message based on the priority of the determined advertisement message and the predicted level of immersion.

The electronic device 100 according to an embodiment of the disclosure may determine a provision or display method of a received advertisement message based on the priority of the determined advertisement message and the predicted level of immersion.

The electronic device 100 according to an embodiment of the disclosure may trigger a first notification for a notification message according to the first notification time and the first notification method of the advertisement message.

According to an embodiment of the disclosure, the electronic device 100 may trigger an advertisement message notification immediately after the viewing of a corresponding program ends, based on the priority of the advertisement message and the predicted level of immersion of the user with respect to the content being played. The electronic device 100 may expect an improvement in the advertisement effect without interfering with the user's viewing of the content.

According to an embodiment of the disclosure, the electronic device 100 may immediately trigger an advertisement message notification during content playback based on the priority of the advertisement message and the predicted level of immersion of the user with respect to the content being played, or may notify the advertisement message when the electronic device 100 is powered off.

According to an embodiment of the disclosure, the electronic device 100 may not trigger an advertisement message notification based on the priority of the advertisement message and the predicted level of immersion of the user with respect to the content being played.

The electronic device 100 according to an embodiment of the disclosure may update the first machine learning model and the second machine learning model based on the user feedback with respect to the first notification of the advertisement message.

The description of a notification message may apply to the advertisement message.

Figure 5:
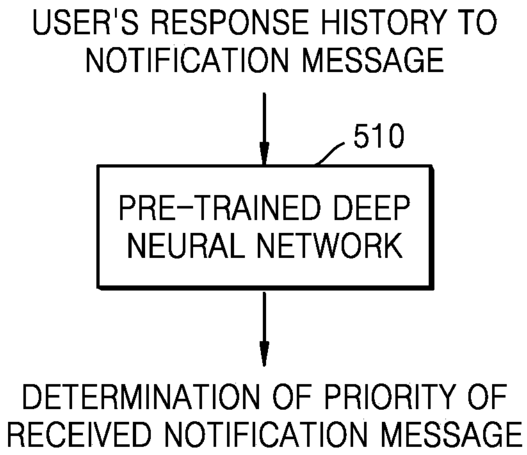
FIG. 5 is a drawing showing an example of a method of determining the priority of a received notification message by using artificial intelligence (AI), the method being performed by an electronic device according to an embodiment of the disclosure.

FIG. 5 is a drawing showing an example of a method of determining the priority of a received notification message by using artificial intelligence, the method being performed by an electronic device according to an embodiment of the disclosure.

The electronic device 100 according to an embodiment of the disclosure may determine the priority of a received notification message through a neural network trained based on a response history of a user with respect to one or more notification messages corresponding to the notification message.

Artificial intelligence is a computer system that implements human-level intelligence, for example, a system in which a machine learns and judges on its own and the recognition rate improves with use. Artificial intelligence technology is composed of machine learning (deep learning) technology that uses an algorithm that classifies/learns the characteristics of input data on its own, and element technologies that mimic the functions of the human brain, such as cognition and judgment, by utilizing machine learning algorithms.

For example, the element technologies may include at least one of linguistic understanding technology that recognizes human language/characters, visual understanding technology that recognizes objects as if they are human vision, inference/prediction technology that determines information and logically infers and predicts, knowledge expression technology that processes human experience information as knowledge data, or motion control technology that controls autonomous driving of vehicles and movements of robots.

Figure 16:
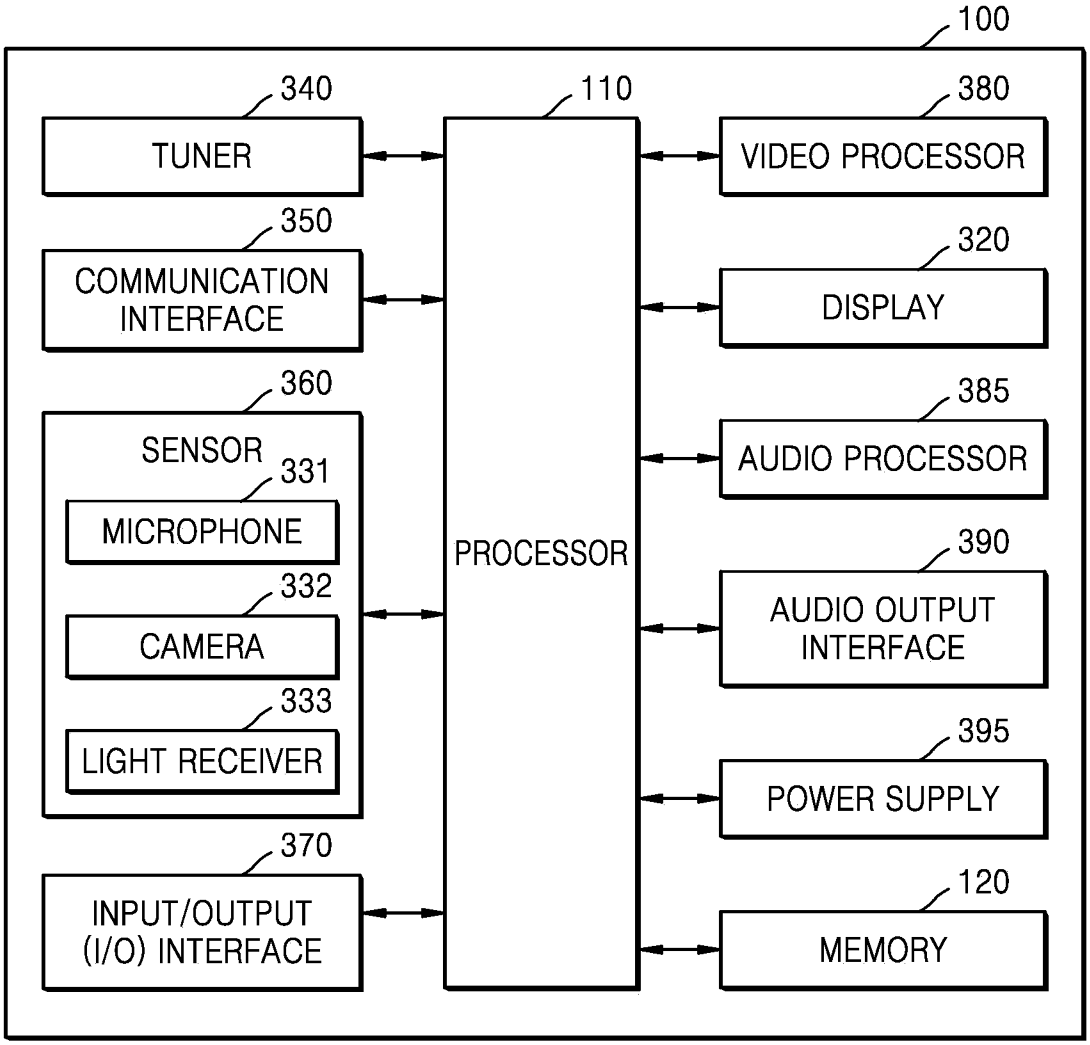
FIG. 16 is a detailed block diagram of an electronic device according to an embodiment of the disclosure.

The function related to artificial intelligence according to the disclosure may be operated through a processor 110 and memory 120 of FIG. 16. The processor 110 may be composed of one or more processors. The one or more processors may include a central processing unit (CPU), such as a CPU, an AP, or a Digital Signal Processor (DSP), a dedicated graphics processor, such as a Graphic Processing Unit (GPU) or a Vision Processing Unit (VPU), or a dedicated artificial intelligence processor, such as a Neural Network Processing Unit (NPU). The one or more processors may control input data to be processed according to a predefined operation rule or artificial intelligence model stored in the memory 120. When the one or more processors include a dedicated artificial intelligence processor, the dedicated artificial intelligence processor may be designed as a hardware structure for processing a certain artificial intelligence model.

The predefined operation rule or artificial intelligence model is characterized by being created through learning. Here, being created through learning means that an artificial intelligence model is trained by using a plurality of pieces of learning data via a learning algorithm, thereby creating a predefined operation rule or artificial intelligence model set to perform a desired characteristic (or, purpose). The learning may be performed in the electronic device 100 itself on which the artificial intelligence according to the disclosure is performed, or may be performed through a separate server and/or system. Examples of learning algorithms include supervised learning, unsupervised learning, semi-supervised learning, or reinforcement learning, but are not limited thereto.

The artificial intelligence model may be composed of a plurality of neural network layers. Each of the plurality of neural network layers has a plurality of weight values and performs neural network operations through operations between the operation results of a previous layer and the plurality of weight values. The plurality of weight values of the plurality of neural network layers may be optimized by the learning results of the artificial intelligence model. For example, the plurality of weight values may be updated so that the loss value or cost value obtained from the artificial intelligence model is reduced or minimized during a learning process.

In an embodiment using a deep learning algorithm, the processor 110 may determine the priority of a received notification message by using a pre-trained deep neural network model 510.

The pre-trained deep neural network model 510 may be an artificial intelligence model trained through learning that obtains a response history of a user with respect to one or more notification messages corresponding to a notification message as input and outputs priority information of the received notification message as an output value.

A deep neural network model may be, for example, a convolutional neural network (CNN) model. The disclosure is not limited thereto, and the deep neural network model may be a known artificial intelligence model including at least one of a recurrent neural network (RNN), a restricted Boltzmann machine (RBM), a deep belief network (DBN), a bidirectional recurrent deep neural network (BRDNN), or a deep Q-network.

The electronic device 100 may also determine the third priority of the notification message by using various machine learning algorithms using regression models and multiple linear regression analysis.

According to an embodiment of the disclosure, the pre-trained deep neural network model 510 may be an artificial intelligence model trained through learning that obtains, as inputs, the response history of the user with respect to one or more notification messages corresponding to the notification message and the priority information of each notification message set by a notification message sender and outputs the priority information of the received notification message.

According to an embodiment of the disclosure, the pre-trained deep neural network model 510 may be an artificial intelligence model trained through learning that obtains, as inputs, the response history of the user with respect to one or more notification messages corresponding to the notification message, the characteristics of the notification message sender, and the priority information of each notification message set by the notification message sender and outputs the priority information of the received notification message.

According to an embodiment of the disclosure, the pre-trained deep neural network model 510 may be an artificial intelligence model trained through learning that obtains, as inputs, the response history of the user with respect to one or more notification messages corresponding to the notification message, environmental information around the electronic device 100 at the time the notification message is received, the characteristics of the notification message sender, and the priority information of each notification message determined by the notification message sender and outputs the priority information of the received notification message. The characteristics of the notification message sender may include functional characteristics of the notification message sender. The environmental information around the electronic device 100 at the time the notification message is received may include information on the time, date, season, and location at which the notification message is received.

Figure 6:
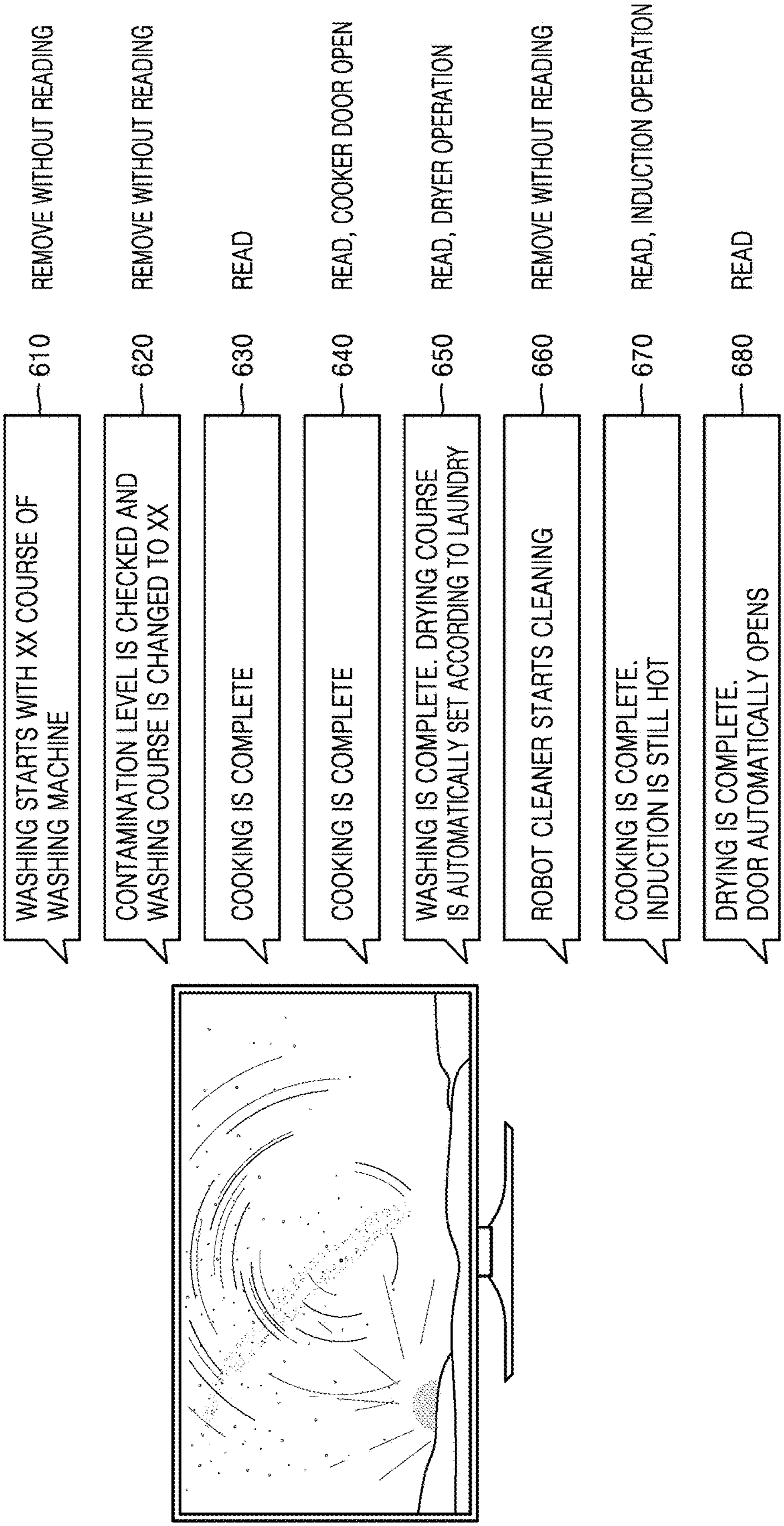
FIG. 6 is a diagram showing an example of a user's notification message response history obtained by an electronic device according to an embodiment of the disclosure.

FIG. 6 is a diagram showing an example of a user's notification message response history obtained by an electronic device according to an embodiment of the disclosure.

According to the embodiment of FIG. 6, the electronic device 100 may store the following notification message response history for the user.

The electronic device 100 may store user's notification message response information that a notification message 610, "Washing starts with XX course of washing machine", received from a washing machine while playing content was not confirmed and removed.

The electronic device 100 may store user's notification message response information that a notification message 620, "Contamination level is checked and washing course is changed to XX", received from the washing machine while playing content was not confirmed and removed.

The electronic device 100 may store user's notification message response information that a notification message 630, "Cooking is complete", received from a cooker while playing content was confirmed.

The electronic device 100 may store user's notification message response information that a follow-up action of opening a cooker door was performed after a notification message 640, "Cooking is complete", received from the cooker while playing content was confirmed.

The electronic device 100 may store user's notification message response information that a follow-up action of operating a dryer was performed after a notification message 650, "Washing is complete. Drying course is automatically set according to laundry", received from the washing machine while playing content was confirmed.

The electronic device 100 may store user's notification message response information that a notification message 660, "Robot cleaner starts cleaning", received from the robot cleaner while playing content was not confirmed and removed.

The electronic device 100 may store user's notification message response information that a follow-up action of operating an induction was performed after a notification message 670, "Cooking is complete. Induction is still hot", received from the induction while playing content was confirmed.

The electronic device 100 may store user's notification message response information that a notification message 680, "Drying is complete. Door automatically opens", received from the dryer while playing content has been confirmed.

According to an embodiment of the disclosure, the electronic device 100 may store the elapsed time from the time each notification message is received to the time confirmed by the user and use the elapsed time to determine the timing of message notification. According to an embodiment of the disclosure, the electronic device 100 may identify a message with a shorter elapsed time as a prioritized message.

The notification message response history accumulated for a long period of time for a user may provide reference information for determining how the user considers a notification message received from a certain external device 300.

According to an embodiment of the disclosure, the user's notification message response history may include a time taken to confirm a received notification message, a confirmation frequency, a method of confirming the notification message after receiving the notification message, and a method of removing the notification message.

According to an embodiment of the disclosure, the electronic device 100 may determine the priority of a received notification message by considering not only the accumulated notification message response history for the user, but also the priority information for each notification message set by a notification message sender.

For example, even when the notification message is sent from the same refrigerator, a message that notifies the opening or closing of the refrigerator door may be set as a notification with a low priority by the refrigerator, whereas a notification message that the refrigerator door has not been closed for a certain time or more may be set as a notification with a relatively higher priority.

According to an embodiment of the disclosure, the electronic device 100 may determine the priority of a notification message received from a notification message sender based on the priority of the notification message set by the notification message sender.

Figure 7:
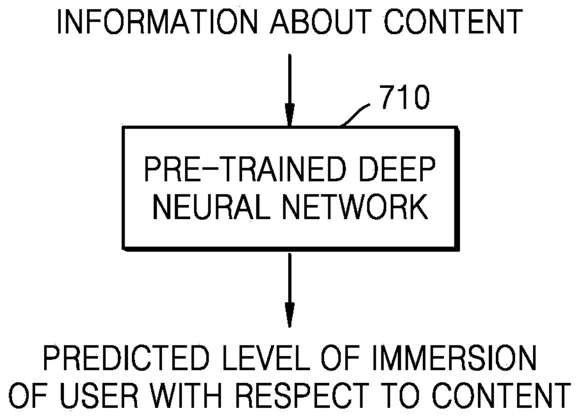
FIG. 7 is a drawing showing an example of a method of obtaining a predicted level of immersion of a user with respect to content by using artificial intelligence, the method being performed by an electronic device according to an embodiment of the disclosure.

FIG. 7 is a drawing showing an example of a method of obtaining a predicted level of immersion of a user with respect to content by using artificial intelligence, the method being performed by an electronic device according to an embodiment of the disclosure.

For additional implementation details, reference may also be made to the descriptions of FIG. 5.

The electronic device 100 according to an embodiment of the disclosure may predict a level of immersion with respect to the content being played, through a neural network trained based on input information about the content being played.

According to an embodiment of the disclosure, the information about the content may include at least one of the type, genre, motion analysis information, color analysis information, running time information, whether it is a series, or the user's playback information of the content being played.

For example, the user's level of immersion with respect to the content when the type of the content is 'advertisement' may be predicted to be lower than the user's level of immersion with respect to the content when the type of the content is 'drama'.

According to an embodiment of the disclosure, the information about the content may include time sequential information after the electronic device 100 started to be used. The time sequential information after the electronic device 100 started to be used may include information, such as remote control operation information and operation sequence while viewing the content, and whether another external device is used while viewing the content.

For example, the electronic device 100 may predict that a level of immersion with respect to the content being played is low when the user uses the smartphone for a long time while viewing the content.

In an embodiment using a deep learning algorithm, the processor 110 may predict the level of immersion with respect to the content being played by using a pre-trained deep neural network model 710.

The pre-trained deep neural network model 710 may be an artificial intelligence model trained through learning that obtains, as input, information about the content being played and outputs an immersion level prediction for the content being played.

The electronic device 100 may predict and output the level of immersion with respect to the content being played by using various machine learning algorithms.

According to an embodiment of the disclosure, the pre-trained deep neural network model 710 may be an artificial intelligence model trained through learning that obtains, as inputs, information about the content being played and context information of the user viewing the content and outputs an immersion level prediction for the content being played.

According to an embodiment of the disclosure, the context information of the user may include at least one of the usage status of at least one external device 300 connected to the electronic device 100, the user's motion information, or the response history of the user with respect to one or more notification messages corresponding to the notification of the notification message.

For example, when a user viewing content uses at least one external device 300 connected to the electronic device 100, the electronic device 100 may predict that the user's level of immersion with respect to the content being viewed is classified as low.

According to an embodiment of the disclosure, the electronic device 100 may predict that the user's level of immersion with respect to the content being viewed is classified lower as the frequency of use or the duration of use of at least one external device 300 connected to the electronic device 100 of the user viewing content is frequent or long.

According to an embodiment of the disclosure, the deep neural network model 710 may be trained based on context information of the user obtained from the electronic device 100 or information about various contents played on the electronic device 100.

According to an embodiment of the disclosure, the pre-trained deep neural network model 710 may be an artificial intelligence model trained through learning that obtains, as inputs, information about the content being played, context information of the user viewing the content, and environmental information around the electronic device 100 and outputs an immersion level prediction for the content being played.

According to an embodiment of the disclosure, the learning may be separately performed in the server 200 or may be performed in the electronic device 100.

Figure 8:
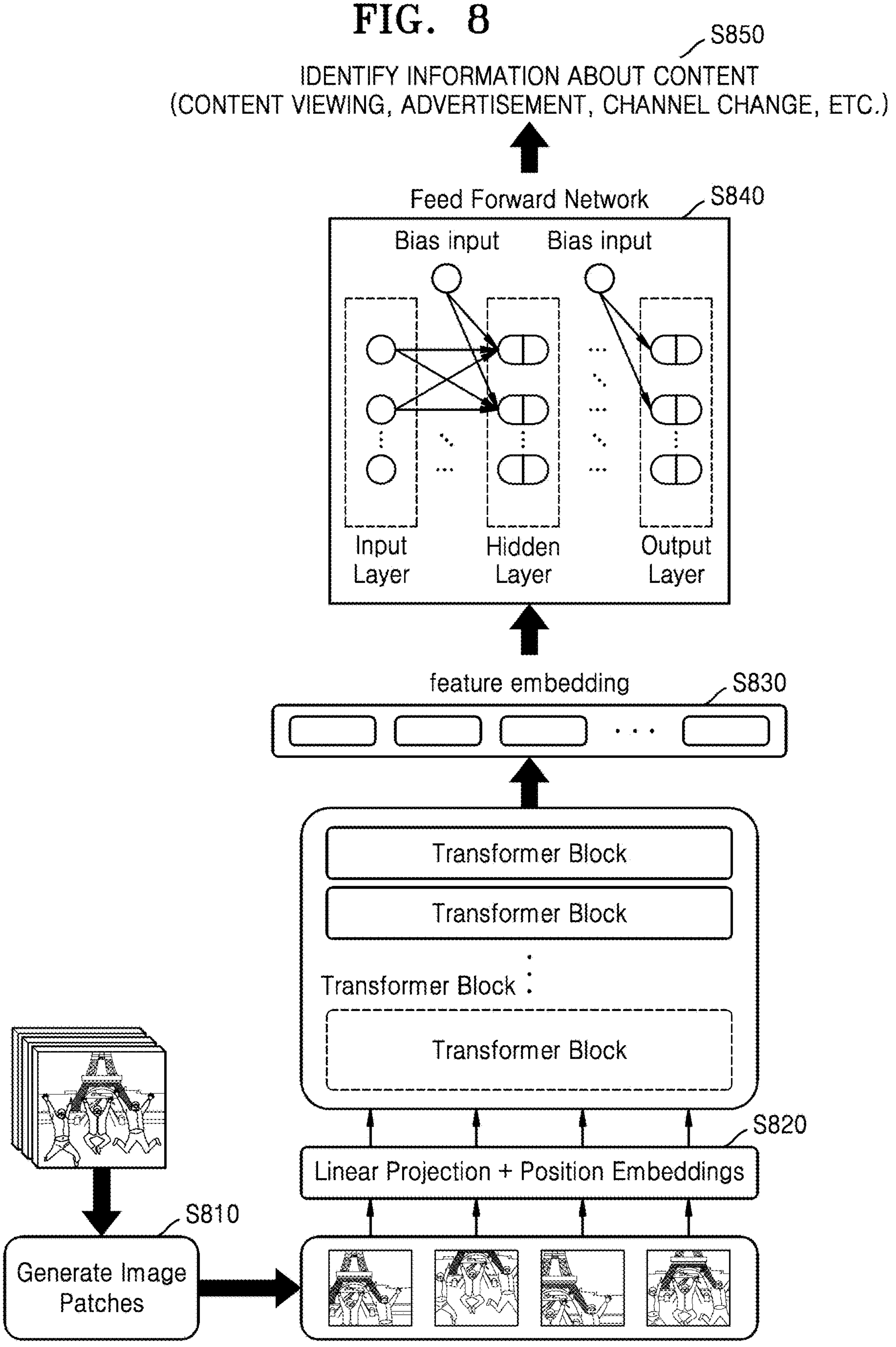
FIG. 8 is a flowchart of a method of identifying information about content to obtain a predicted level of immersion of a user with respect to content, the method being performed by an electronic device according to an embodiment of the disclosure.

FIG. 8 is a flowchart of a method of identifying information about content to obtain a predicted level of immersion with respect to content, the method being performed by an electronic device according to an embodiment of the disclosure.

Referring to FIG. 8, the electronic device 100 according to an embodiment of the disclosure may generate a plurality of image patches by dividing at least one scene of content being played (Operation S810).

The electronic device 100 according to an embodiment of the disclosure may perform linear projection and position embedding for each image patch (Operation S820). In Operation S820, the electronic device 100 may extract features of each image patch through linear transformation and position embedding of each image patch.

The electronic device 100 according to an embodiment of the disclosure may execute feature embedding (Operation S830).

The feature embedding may refer to the process of converting obtained features into vector form. The feature embedding may be used in new learning or deep learning, and may reduce high-dimensional data into low-dimensional data to enable efficient processing.

The feature embedding is performed for various reasons, but one of the biggest reasons for performing the feature embedding is to reduce 'nonlinear' data, which is not linearly expressed and therefore difficult to analyze using general linear regression or classification algorithms, to an appropriate dimension and express linearly the reduced nonlinear data.

The electronic device 100 according to an embodiment of the disclosure may obtain more accurate and effective results when performing tasks such as classifying or clustering data by placing data with similar characteristics in close locations and placing data with different characteristics far apart through feature embedding.

The feature embedding is a learnable parameter, and has the characteristic of automatically finding an optimal embedding space while the model learns, and when a sufficient amount of training data is provided, the model may identify the characteristics of the data on its own and configure an embedding space that fits the characteristics of the data.

The electronic device 100 according to an embodiment of the disclosure may resolve nonlinearity by converting high-dimensional data into low-dimensional vectors through the feature embedding, reflect similarities and differences between data, and find an optimal embedding space through a learnable parameter.

The electronic device 100 according to an embodiment of the disclosure may express the characteristics of each frame of an image patch as a vector through the feature embedding.

The electronic device 100 according to an embodiment of the disclosure may identify information about content through a feed forward network (Operation S840 and Operation S850).

The feed forward network refers to a neural network in which information flows only in one direction from an input layer to an output layer, for example, a network that operates only in a forward direction without feedback.

The feed forward network may be composed of three layers including an input layer, a hidden layer, and an output layer. The input layer receives data from the outside, the hidden layer processes input data and performs operations, and the output layer outputs a final output based on the results of the hidden layer's execution.

An activation function exists between the layers and may limit input values to a certain range or impart nonlinearity. Examples of representative activation functions include ReLU, sigmoid, tanh, for example, and recently, modified forms of activation functions, such as LeakyReLU, are also being used.

The feed forward network has the advantage of being easy to implement and fast due to its simple structure, and is widely used in various fields, such as image classification and voice recognition.

According to an embodiment of the disclosure, the information about content may include context information, such as what type of content is being played, whether an advertisement is being played, and whether a channel is being changed.

The electronic device 100 according to an embodiment of the disclosure may output a vector obtained from a transformer block in a desired form by using the feed forward network (Operation S840). For example, the electronic device 100 may identify information about what type of content is being played, whether an advertisement is being played, and whether a channel is being changed.

According to an embodiment of the disclosure, the electronic device 100 may input, to the feed forward network, an output from the transformer block, the usage status of various external devices 300, and the user's habit data for processing the notification of notification messages received from the external devices 300 when viewing content.

According to an embodiment of the disclosure, the electronic device 100 may output, from the feed forward network, a descriptor describing the user's content viewing status based on user characteristic information, and the relationship between the external devices 300.

According to an embodiment of the disclosure, the electronic device 100 may identify information about content, such as what type of content is being played, whether an advertisement is being played, and whether a channel is being changed, through the feed forward network.

Figure 9:
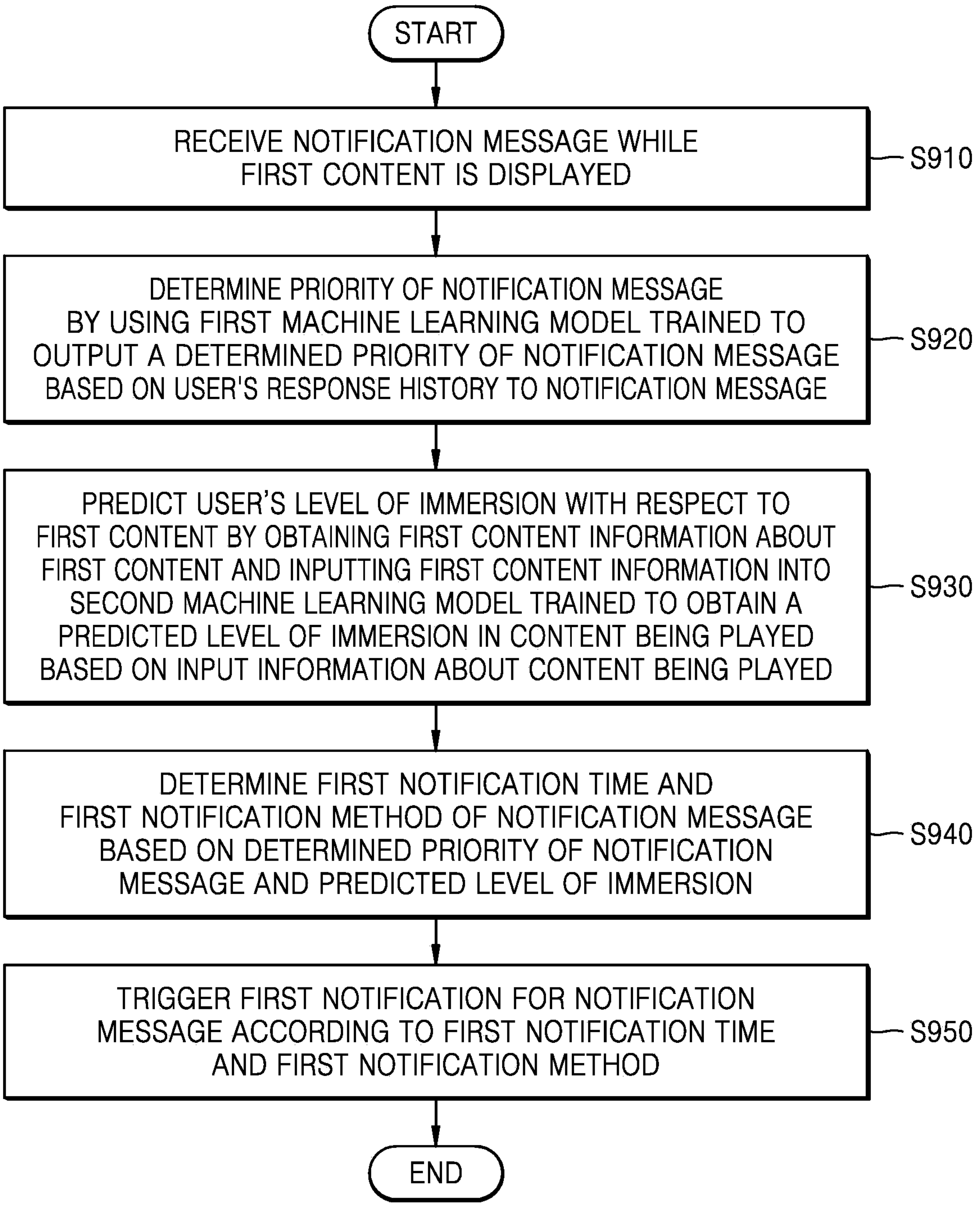
FIG. 9 is a flowchart of an operating method of an electronic device according to an embodiment of the disclosure.

FIG. 9 is a flowchart of an operating method of an electronic device according to an embodiment of the disclosure.

Referring to FIG. 9, the electronic device 100 according to an embodiment of the disclosure may receive a notification message while a first content is displayed (Operation S910).

The first content may be one of all images that may be played on the electronic device 100. The notification message may be a message transmitted from at least one external device 300 or an application or hardware in the electronic device 100. The notification message may be in the form of text or an image. The length of the notification message may vary.

The electronic device 100 according to an embodiment of the disclosure may determine the priority of a notification message by using a first machine learning model trained to output the determined priority of an input notification message based on a response history of a user with respect to one or more notification messages corresponding to the notification message (Operation S920).

According to an embodiment of the disclosure, the first machine learning model may be a model trained to determine the priority of the notification message described with reference to in FIGS. 5 and 6, for example. Accordingly, for additional implementation details, reference may be made to the descriptions of FIGS. 5 and 6.

The electronic device 100 according to an embodiment of the disclosure may obtain a predicted level of immersion of the user with respect to the first content by obtaining first content information about the first content and inputting the first content information into a second machine learning model trained to obtain a predicted level of immersion of a user with respect to the content being played based on input information about the content being played (Operation S930).

According to an embodiment of the disclosure, the second machine learning model may be a model trained to obtain a predicted level of immersion of the user with respect to the content being played, described with reference to FIGS. 7 and 8. Accordingly, for additional implementation details, reference may be made to the descriptions of FIGS. 7 and 8.

The electronic device 100 according to an embodiment of the disclosure may determine a first notification time and a first notification method of a notification message based on the priority of the notification message and the predicted level of immersion (Operation S940).

The electronic device 100 according to an embodiment may adjust the weights of the priority of the notification message and the predicted level of immersion that are considered in order to determine the notification time and the notification method of the notification message. For example, the electronic device 100 may reflect the weight of the priority of the notification message as 60% and the weight of the predicted level of immersion as 40%. For example, the electronic device 100 may consider the priority of the notification message determined in Operation S920 as having a higher priority than the user's level of immersion predicted in Operation S930 to determine the notification time and notification method of the notification message.

The electronic device 100 according to an embodiment of the disclosure may determine the notification method of the notification message by distinguishing the notification method into the "Aggregation and Notice later" type, the "Aggregation and Notice at Intermission" type, and the "Notice Now and Instruction" type, as described in the embodiment of FIG. 1. Accordingly, for additional implementation details, reference may be made to the descriptions of FIG. 1.

The electronic device 100 according to an embodiment of the disclosure may classify the notification time of the notification message into immediate notification, notification during advertisement, notification when using a remote control, notification when changing scenes, notification after viewing content, for example The electronic device 100 according to an embodiment of the disclosure may trigger a notification message by selecting at least one notification method among combining a plurality of notification messages and triggering a single message notification, triggering a pop-up notification, triggering a text bar notification, storing a notification message without notification, triggering a voice output notification, and requesting feedback from the user based on triggering a notification. The notification method of the notification message is not limited to those described above. The method of combining a plurality of notification messages and triggering a single message notification will be described below with reference to FIGS. 10 to 13.

The electronic device 100 according to an embodiment of the disclosure may trigger a notification message by varying the location of the message notification and the size, thickness, color, for example of the message according to the priority of the message determined in Operation S920.

For example, a notification message having high priority may be displayed in large and bold letters in the center of a screen. According to an embodiment of the disclosure, a prioritized portion of the content of the notification message may be highlighted in red.

The electronic device 100 according to an embodiment of the disclosure may trigger a first notification for a notification message according to the first notification time and the first method (Operation S950).

The electronic device 100 according to an embodiment of the disclosure may trigger a first notification for a notification message according to the first notification time and the first notification method determined in Operation S940 based on the priority of the notification message determined in Operation S920 and the user's level of immersion predicted in Operation S930.

The electronic device 100 according to an embodiment of the disclosure may determine whether to re-trigger a notification message based on the priority score of the notification message.

For example, in the case of a message sent from a high-risk notification message sender such as an induction, the notification message may be re-triggered, even when the user has deleted a notification content, by considering the current temperature (residual heat generation) of the induction, whether there are dishes left on the induction, whether the power is turned off, for example.

According to an embodiment of the disclosure, the re-triggered notification message may be displayed in the form of a pop-up message. According to an embodiment of the disclosure, the electronic device 100 may change the form of the pop-up by considering the priority score of the notification message.

According to an embodiment of the disclosure, the electronic device 100 may automatically delete a related notification message if it is determined that there is no dangerous situation.

Figure 10:
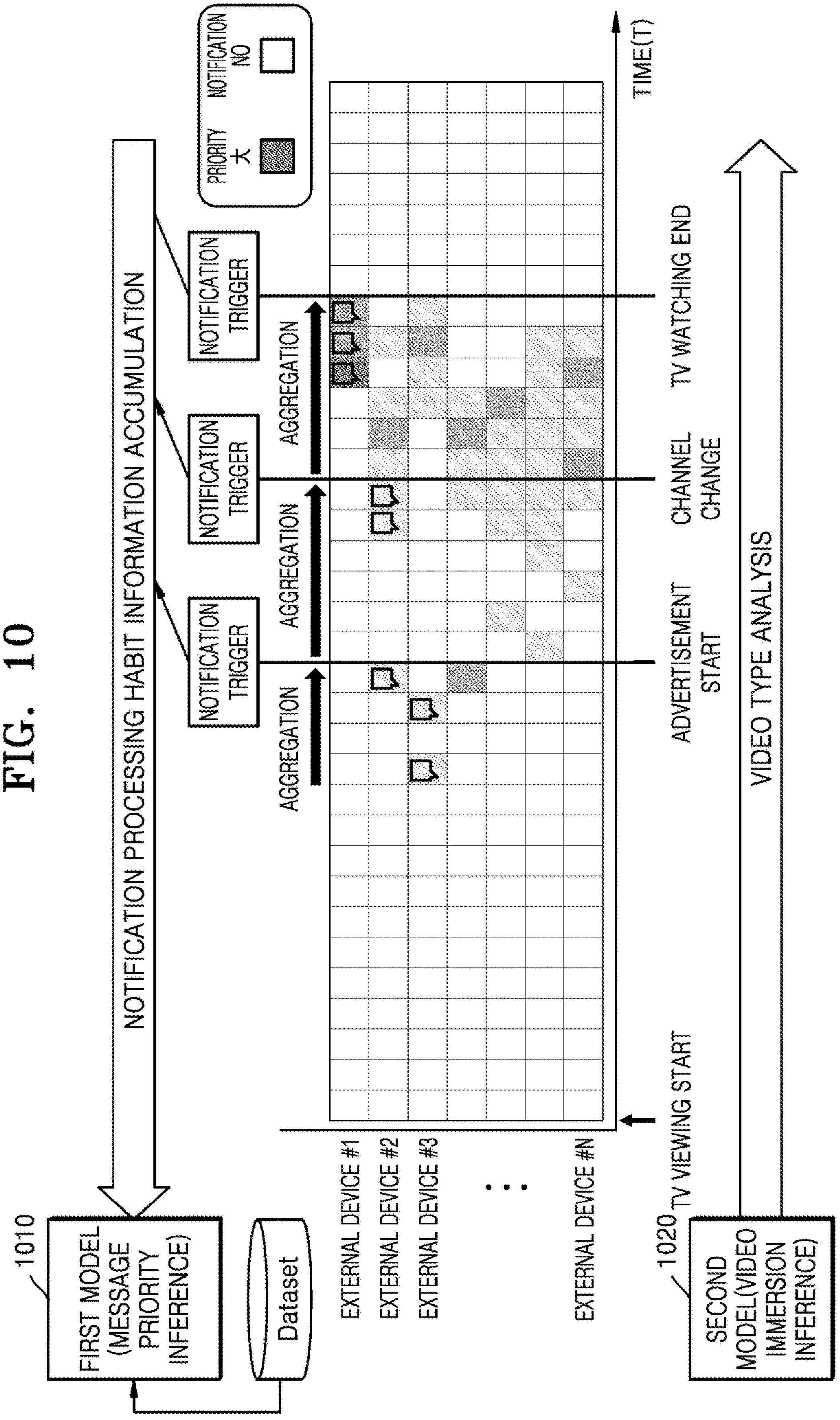
FIG. 10 is a diagram showing an example of a method of triggering a notification message, the method being performed by an electronic device according to an embodiment of the disclosure.

FIG. 10 is a diagram showing an example of a method of triggering a notification message, the method being performed by an electronic device according to an embodiment of the disclosure.

In the embodiment of FIG. 10, the electronic device 100 may be a smart TV. After TV watching starts, two notification messages may be received from an external device #3, and then one notification message may be received from an external device #2. The above notification messages may be messages having low priority. The priority of the above notification messages may be determined by a first model 1010, for example, a model that determines the priority of a message. The first model 1010 may be the same as the first machine learning model described with reference to FIG. 9. Accordingly, for additional implementation details, reference may be made to the descriptions of FIG. 9.

In the embodiment of FIG. 10, the TV may not immediately notify the user of the two notification messages received from the external device #3 and the one notification message received from the external device #2, but may combine the three notification messages to generate a first combined message, and then notify the user of the first combined message when an advertisement starts between the contents being viewed.

A second model 1020 is a model that predicts the user's level of immersion with respect to content, and may be the same as the second machine learning model described with reference to FIG. 9. Accordingly, for additional implementation details, reference may be made to the descriptions of FIG. 9. The second model 1020 may analyze content information being played and identify the type of video, such as whether a certain content is being played, whether an advertisement is being played, whether a channel has been changed, or whether TV watching has ended.

In the embodiment of FIG. 10, after the first combined message is notified, two notification messages may be further received from the external device #2 while watching TV. The received two notification messages may not be messages having high priority. The TV may not immediately notify the user of the two notification messages received from the external device #2, but may combine the two notification messages to generate a second combined message, and then notify the user of the second combined message when a change in the channel being watched is detected.

In the embodiment of FIG. 10, after the second combined message is notified, three notification messages may be further received from an external device #1 while watching TV. The received three notification messages may have different priority levels. No message may have a higher priority than the priority of the content being viewed. The priority of the content being viewed may be determined based on a prediction result of the second model 1020. The TV may not immediately notify the user of the three notification messages received from the external device #1, but may combine the three notification messages to generate a third combined message, and then notify the user of the third combined message when the end of TV watching is detected. According to an embodiment of the disclosure, the time when the end of TV watching is detected may be the time when the TV is turned off.

The response information of the user for the notified first combined message, second combined message, and third combined message may be stored as a history and used to update the first model.

Figure 11:
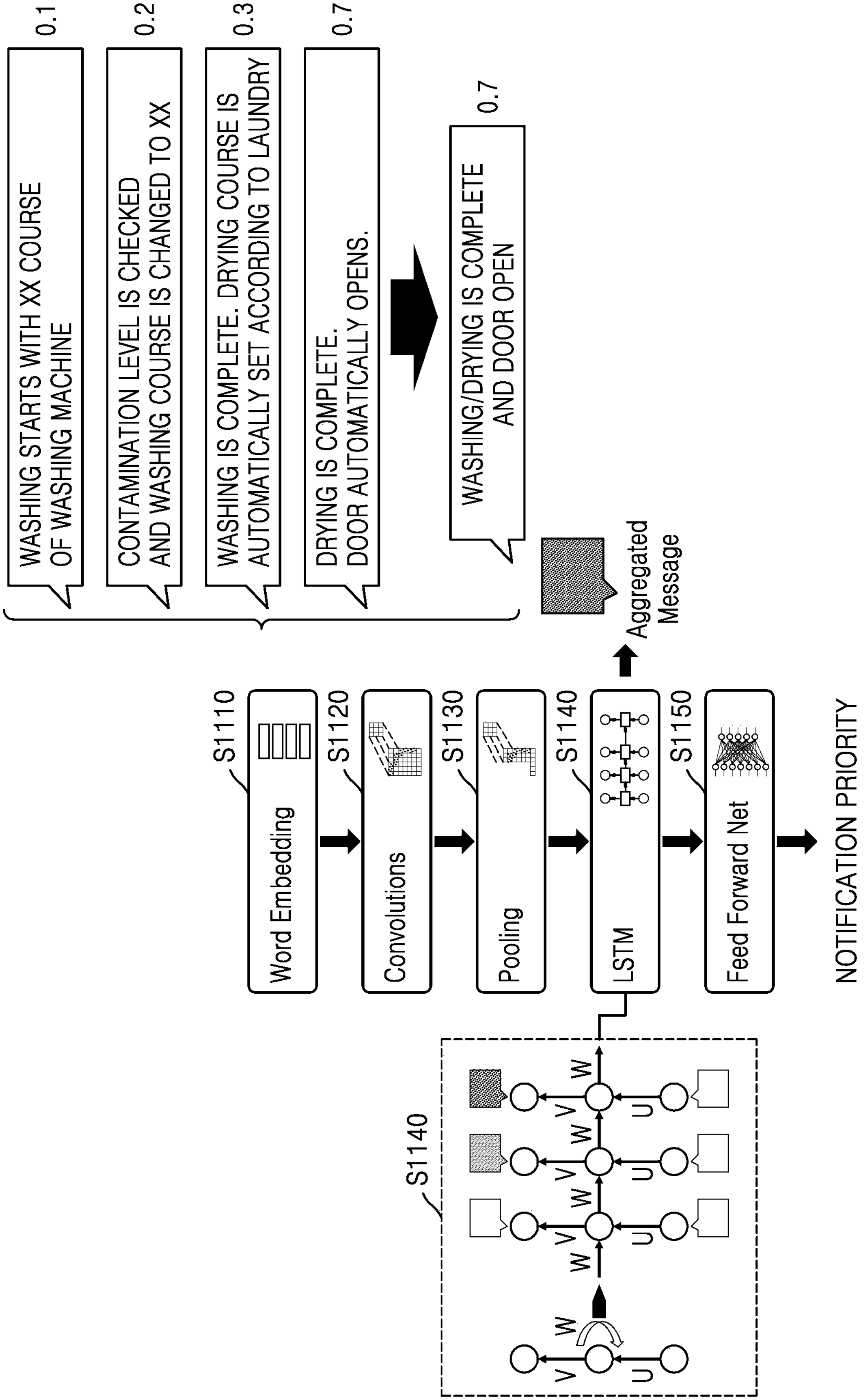
FIG. 11 is a diagram showing an example of a method of determining the priority of a received notification message, the method being performed by an electronic device according to an embodiment of the disclosure.

FIG. 11 is a diagram showing an example of a method of determining the priority of a received notification message, the method being performed by an electronic device according to an embodiment of the disclosure.

Referring to FIG. 11, the electronic device 100 according to an embodiment of the disclosure may perform word embedding (Operation S110).

The word embedding may refer to representing a word in natural language processing (NLP). The representation may be a real-valued vector that encodes the meaning of a word in a way that closer words in a vector space are expected to have similar meanings. The word embedding may be performed using language modeling and feature learning techniques in which words or phrases in a vocabulary are mapped to real-valued vectors.

The electronic device 100 according to an embodiment of the disclosure may store notification messages received from at least one external device 300 or another application, and perform word embedding.

For example, the electronic device 100 may store notification messages, such as "Washing starts with XX course of washing machine," "Contamination level is checked and washing course is changed to XX," "Washing is complete. Drying course is automatically set according to laundry" and "Drying is complete. Door automatically opens", received from a washing machine, which is the external device 300, and may perform word embedding.

The electronic device 100 according to an embodiment of the disclosure may perform Long Short-Term Memory (LSTM) modeling (Operation S1140) through convolutions (Operation S1120) and pooling (Operation S1130) after performing word imbedding on received notification messages (Operation 1110).

According to an embodiment of the disclosure, an LSTM model may effectively combine various notification messages, which come in over time, to generate a combined message.

The electronic device 100 according to an embodiment of the disclosure may generate a combined message by integrating messages accumulated in time order up to a given point in time and new messages by using the LSTM model, determine the priority of the generated combined message, and use the priority of the combined message to determine the notification time and notification method of the combined message.

The electronic device 100 may input the messages accumulated up to a given point in time and the new messages into the LSTM model. Each notification message may include an individually determined priority score. The LSTM model may process messages by considering the priority score of each notification message. The LSTM model may generate a combined message by combining notification messages, and in this process, information to be prioritized may be emphasized and information determined to have a low priority may be omitted. The generated combined message may be assigned a priority score again according to the priority thereof.

According to an embodiment of the disclosure, the priority score may be a result calculated by the LSTM model itself.

According to an embodiment of the disclosure, the LSTM model may perform not only the task of generating a combined message, but also the task of judging the priority of the generated combined message and using the judged priority to determine the notification time and notification method of the combined message.

In the embodiment of FIG. 11, the LSTM model may generate a combined message, such as "Washing/drying is complete and door opens", by combining notification messages, such as "Washing starts with XX course of washing machine," "Contamination level is checked and washing course is changed to XX," "Washing is complete. Drying course is automatically set according to laundry" and "Drying is complete. Door automatically opens", sequentially received.

The LSTM model may synthesize the received notification messages to identify the context in which the washing machine started washing, changed the washing course, started the drying course after washing was complete, and automatically opened the door after drying was complete, and to identify that what is currently meaningful to the user in the context is that washing and drying were complete and the door was open.

The LSTM model may omit notification messages having low priority based on the identified context and leave only notifications that are meaningful to the user in the current situation, and generate a combined message, such as "Washing/drying is complete and the door opens".

The LSTM model may remember the context of previous messages in the long term and reflect the remembered context in the processing of new messages.

The electronic device 100 according to an embodiment of the disclosure may determine the priority of a notification message by calculating a priority score.

In the embodiment of FIG. 11, the electronic device 100 may calculate the priority score for the generated combined message and obtain a score of 0.7.

The priority score for each notification message before the generation of the combined message may be calculated as follows: the priority score for "Washing starts with XX course of washing machine" may be calculated as 0.1, the priority score for "Contamination level is checked and washing course is changed to XX" may be calculated as 0.2, the priority score for "Washing is complete. Drying course is automatically set according to laundry" may be calculated as 0.3, and the priority score for "Drying is complete. Door automatically opens" may be calculated as 0.7. The priority score for each notification message may also be generated from the LSTM model.

According to an embodiment of the disclosure, the electronic device 100 may determine the priority score of the generated combined message to be the same as that of the message whose main part of the content matches, for example, the message "Drying is complete. Door automatically opens".

According to an embodiment of the disclosure, when the generated combined message further contains meaningful information other than the message whose main part of the content matches, for example, "Drying is complete. Door automatically opens", the electronic device 100 may determine the priority score of the generated combined message to be higher than that of the message whose main part of the content matches.

The electronic device 100 according to an embodiment of the disclosure may output a vector as a desired form of notification priority through a feed forward network (Operation S1150).

Descriptions that are redundant with those already provided with reference to FIG. 8 regarding the feed forward network are omitted.

According to an embodiment of the disclosure, the notification priority may be output in the form of a priority score.

According to an embodiment of the disclosure, the notification priority may be output as a high, medium, or low priority score.

The notification priority may be output in various forms.

The electronic device 100 according to an embodiment of the disclosure may output individual notification messages and a combined message by distinguishing them according to priority using the feed forward network.

For example, the electronic device 100 may output a notification message by distinguishing the notification message into the "Aggregation and Notice later" type, the "Aggregation and Notice at Intermission" type, and the "Notice Now and Instruction" type, as described with reference to FIG. 1.

Figure 12:
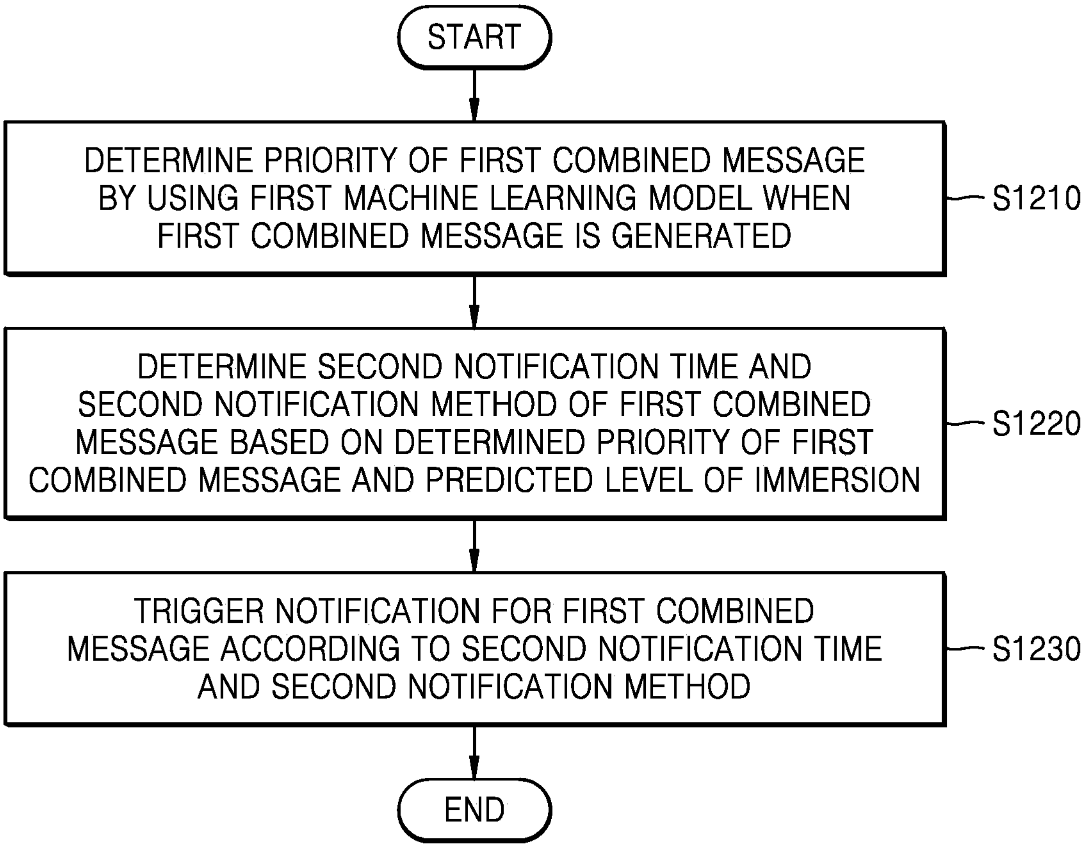
FIG. 12 is a flowchart of a method of processing a combined message, the method being performed by an electronic device according to an embodiment of the disclosure.

FIG. 12 is a flowchart of a method of processing a combined message, the method being performed by an electronic device according to an embodiment of the disclosure.

The electronic device 100 according to an embodiment of the disclosure may store a first notification message received while viewing content, without immediately outputting the first notification message, based on the priority of the notification message and the predicted level of immersion.

The electronic device 100 according to an embodiment of the disclosure may store a second notification message received while viewing content, without immediately outputting the second notification message, based on the priority of the notification message and the predicted level of immersion.

The electronic device 100 according to an embodiment of the disclosure may identify that a first notification message that has not been notified is stored before storing the second notification message.

The electronic device 100 according to an embodiment of the disclosure may generate a first combined message by combining the first notification message and the second notification message.

Referring to FIG. 12, the electronic device 100 according to an embodiment of the disclosure may determine the first priority of the first combined message by using a first machine learning model when the first combined message is generated (Operation S1210).

The first machine learning model is the same as that described with reference to FIG. 9. Accordingly, for additional implementation details, reference may be made to the descriptions of FIG. 9.

According to an embodiment of the disclosure, the first priority of the first combined message may be the same as one of the priorities of the first notification message and the second notification message, or may be higher than the priorities of the first notification message and the second notification message.

The electronic device 100 according to an embodiment of the disclosure may determine the notification time and notification method of the first combined message based on the first priority of the first combined message and the predicted level of immersion (Operation S1220).

The determination of the notification time and notification method of the first combined message may be performed in the same manner as determining the notification time and notification method of a notification message.

The electronic device 100 according to an embodiment of the disclosure may notify the first combined message according to the determined notification time and notification method (Operation S1230).

Notification of the first combined message may be performed in the same manner as notification of a notification message.

According to an embodiment of the disclosure, the electronic device 100 may determine to store the first combined message without immediately notifying the first combined message.

According to an embodiment of the disclosure, the electronic device 100 may store a third notification message received while viewing content, without immediately outputting the third notification message, based on the priority of the notification message and the predicted level of immersion.

According to an embodiment of the disclosure, the electronic device 100 may identify the presence of an unnotified first combined message when storing the third notification message.

According to an embodiment of the disclosure, the electronic device 100 may generate a second combined message by combining the first combined message and the third notification message.

According to an embodiment of the disclosure, the electronic device 100 may determine a second priority of the second combined message by using the first machine learning model when the second combined message is generated.

According to an embodiment of the disclosure, a second priority of the second combined message may be the same as or higher than one of the priorities of the first combined message and the third notification message.

The electronic device 100 according to an embodiment of the disclosure may determine the notification time and notification method of the second combined message based on the second priority of the second combined message and the predicted level of immersion.

The electronic device 100 according to an embodiment of the disclosure may notify the second combined message according to the determined notification time and notification method.

Figure 13:
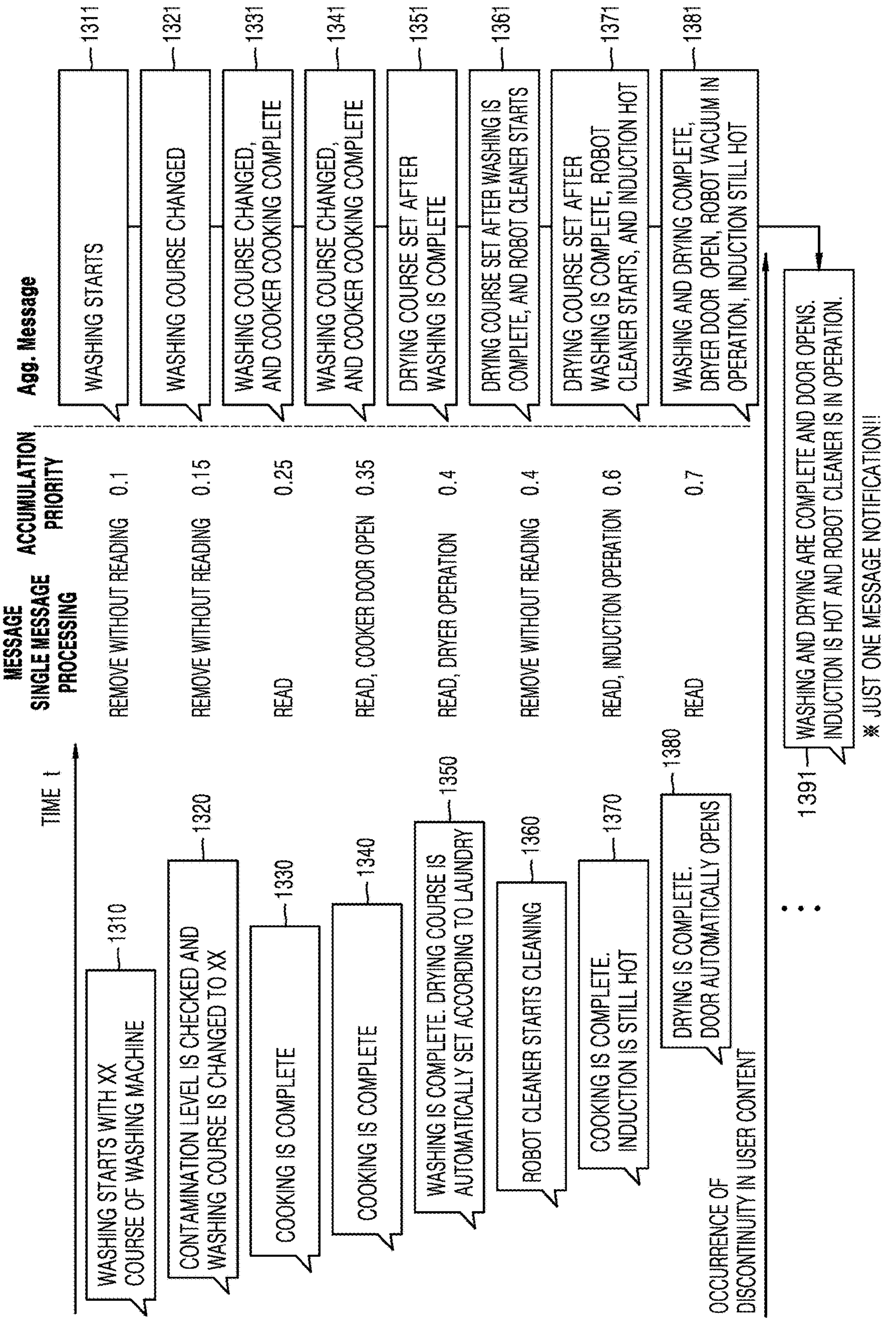
FIG. 13 is a diagram for explaining a method of generating a combined message by combining received notification messages and a change in priority in the process of performing the method, the method being performed by an electronic device according to an embodiment of the disclosure.

FIG. 13 is a diagram for explaining a method of generating a combined message by combining received notification messages and a change in priority in the process of performing the method, the method being performed by an electronic device according to an embodiment of the disclosure.

The electronic device 100 according to an embodiment of the disclosure may receive a message 1310, "Washing starts with XX course of washing machine", from a washing machine, which is the external device 300, during content playback. Because the priority score of the message 1310 calculated by the electronic device 100 is 0.1, the message 1310 may be stored without being immediately notified.

According to an embodiment of the disclosure, the electronic device 100 may be set to immediately notify the message 1310 when the priority score of the notification message is equal to or greater than a threshold value. In the embodiment of FIG. 13, the electronic device 100 may be set to immediately notify the message 1310 when the priority score of the notification message is equal to or greater than 1.

The electronic device 100 according to an embodiment of the disclosure may generate an unnotified message 1310 into a combined message 1311, such as "Washing starts".

The electronic device 100 according to an embodiment of the disclosure may receive a message 1320, "Contamination level is checked and washing course is changed to XX", from a washing machine, which is the external device 300, during content playback. Because the priority score of the message 1320 calculated by the electronic device 100 is less than 1, the electronic device 100 may store the message 1320 without notifying the message 1320.

An electronic device 100 according to an embodiment of the disclosure may combine an unnotified message 1320 with the combined message 1311 to generate a new combined message 1321, such as "Washing course changed".

The electronic device 100 according to an embodiment of the disclosure may calculate the priority score of the new combined message 1321 to obtain 0.15. The priority score of the new combined message 1321 may be greater than or equal to the priority score of the combined message 1311. For example, as a combined message accumulates, the priority score may increase. Because the priority score is still less than 1, the new combined message 1321 may also be stored without being immediately notified.

The electronic device 100 according to an embodiment of the disclosure may receive a message 1330, "Cooker cooking is complete", from a cooker, which is the external device 300, during content playback. Because the priority score of the message 1330 calculated by the electronic device 100 is less than 1, the electronic device 100 may store the message 1330 without notifying the message 1330.

The electronic device 100 according to an embodiment of the disclosure may generate a new combined message 1331, such as "Washing course changed, and Cooker cooking complete", by combining the unnotified message 1330 with the combined message 1321.

The electronic device 100 according to an embodiment of the disclosure may calculate the priority score of the new combined message 1331 to obtain 0.25. Because the priority score is still less than 1, the new combined message 1331 may also be stored without being immediately notified.

The electronic device 100 according to an embodiment of the disclosure may receive a message 1340, "Cooker cooking is complete," from a cooker, which is the external device 300, during content playback. Because the priority score of the message 1340 calculated by the electronic device 100 is less than 1, the electronic device 100 may store the message 1340 without notifying the message 1340.

The electronic device 100 according to an embodiment of the disclosure may generate a new combined message 1341, such as "Washing course changed, and Cooker cooking complete", by combining the unnotified message 1340 with the combined message 1331.

The electronic device 100 according to an embodiment of the disclosure may calculate the priority score of the new combined message 1341 to obtain 0.35. Because the priority score is still less than 1, the new combined message 1341 may also be stored without being immediately notified.

The electronic device 100 according to an embodiment of the disclosure may receive a notification message 1350, "Washing is complete. Drying course is automatically set according to laundry", and generate a combined message 1351, "Drying course set after washing is complete", in the same manner.

The electronic device 100 according to an embodiment of the disclosure may calculate the priority score of the new combined message 1351 to obtain 0.4. Because the priority score is still less than 1, the new combined message 1351 may also be stored without being immediately notified.

The electronic device 100 according to an embodiment of the disclosure may receive a notification message 1360, "Robot cleaner starts cleaning", and generate a combined message 1361, "Drying course set after washing is complete, and Robot cleaner starts", in the same manner The electronic device 100 according to an embodiment of the disclosure may calculate the priority score of the new combined message 1361 to obtain 0.4. Because the priority score is still less than 1, the new combined message 1361 may also be stored without being immediately notified.

The electronic device 100 according to an embodiment of the disclosure may receive a notification message 1370, "Cooking is complete. Induction is still hot", and generate a combined message 1371, "Drying course set after washing is complete, Robot cleaner starts, and Induction hot", in the same manner.

The electronic device 100 according to an embodiment of the disclosure may calculate the priority score of the new combined message 1371 to obtain 0.6. Because the priority score is still less than 1, the new combined message 1371 may also be stored without being immediately notified.

The electronic device 100 according to an embodiment of the disclosure may receive a notification message 1380, "Drying is complete. Door automatically opens", and generate a combined message 1381, "Washing and drying complete, dryer door open, robot cleaner in operation, and induction still hot", in the same manner The electronic device 100 according to an embodiment of the disclosure may calculate the priority score of the new combined message 1381 to obtain 0.7. Because the priority score is still less than 1, the new combined message 1381 may also be stored without being immediately notified.

The electronic device 100 according to an embodiment of the disclosure may detect the occurrence of discontinuity in user content after the notification message 1380 is received and the combined message 1381 is generated.

According to an embodiment of the disclosure, the discontinuity in user content may be detected when the channel is switched, the viewing content is changed, the advertising content starts, or the electronic device 100 is turned off.

When the occurrence of discontinuity in user content is detected, the electronic device 100 according to an embodiment of the disclosure may generate and trigger a final combined message notification 1391, "Washing and drying are complete and door opens. Induction is hot and robot cleaner is in operation", based on the last combined message 1381.

In the embodiment of FIG. 13, the electronic device 100 receives eight notification messages during content playback, but the notification may be performed only once in the form of the combined message 1391.

Through this process, the electronic device 100 may prevent the user from being interrupted from viewing content due to notification messages determined to have a low priority.

The electronic device 100 may enable the user to effectively obtain information by triggering a notification for only one message 1391 summarizing essential messages at the time of the occurrence of discontinuity in content.

The single message processing history illustrated in the embodiment of FIG. 13 may be the user's previous response history for each notification message.

Figure 14:
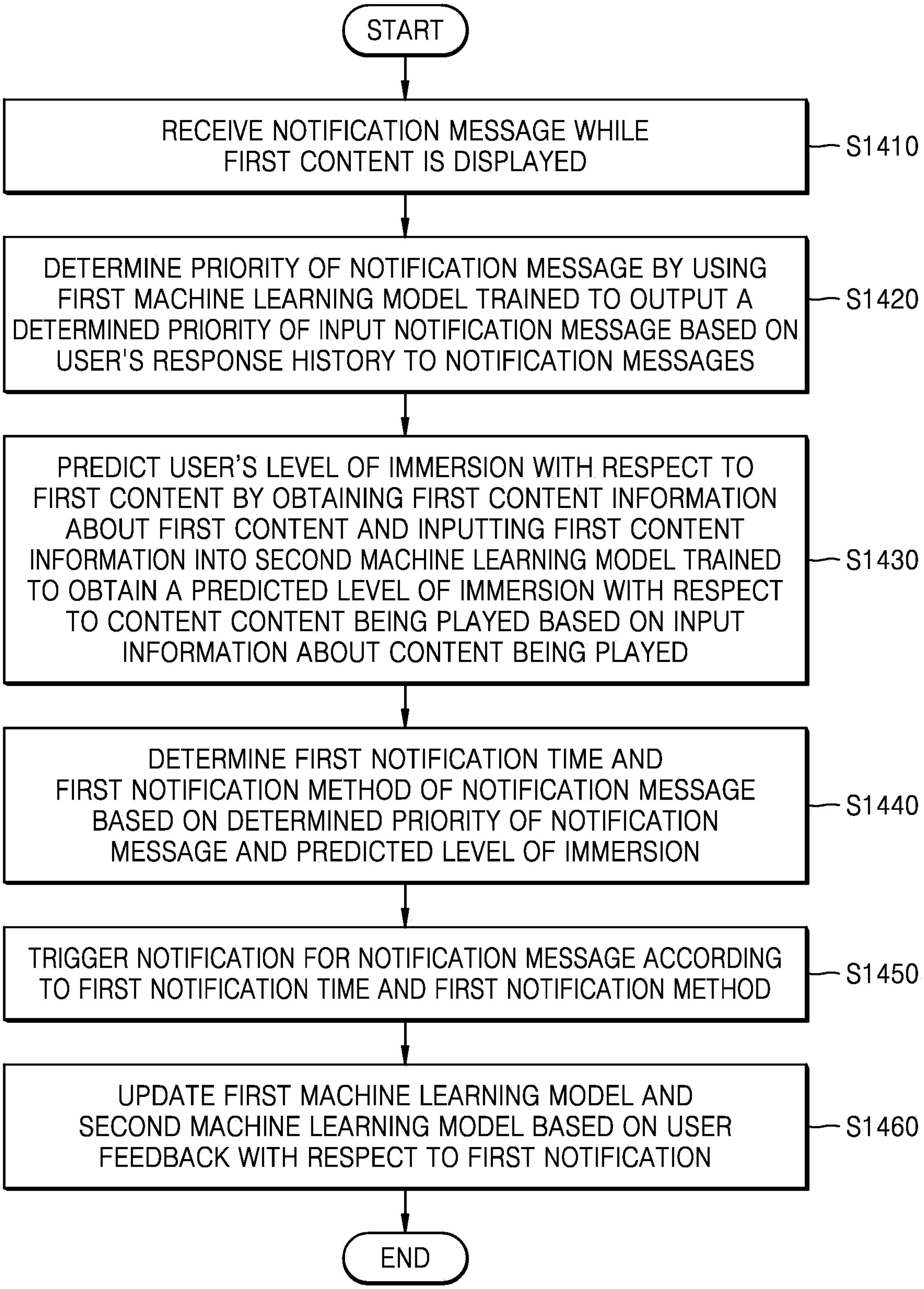
FIG. 14 is a flowchart of a method of operating an electronic device, according to an embodiment of the disclosure.

FIG. 14 is a flowchart of a method of operating an electronic device, according to an embodiment of the disclosure.

Referring to FIG. 14, the electronic device 100 according to an embodiment of the disclosure may receive a notification message while a first content is displayed (Operation S1410).

The electronic device 100 according to an embodiment of the disclosure may determine the third priority of the notification message by using a first machine learning model trained to output a determined priority of an input notification message based on a response history of a user with respect to one or more notification messages corresponding to the notification message (Operation S1420).

The electronic device 100 according to an embodiment of the disclosure may obtain a predicted level of immersion of a user with respect to the first content by obtaining first content information about the first content and inputting the first content information into a second machine learning model trained to obtain a predicted level of immersion of the user with respect to the content being played based on input information about the content being played (Operation S1430).

The electronic device 100 according to an embodiment of the disclosure may determine a first notification time and a first notification method of the notification message based on the priority of the notification message and the predicted level of immersion (Operation S1440).

The electronic device 100 according to an embodiment of the disclosure may trigger a first notification for a notification message according to the first notification time and the first notification method (Operation S1450).

Operations S1410 to S1450 may correspond to Operations S910 to S950 of FIG. 9. Accordingly, for additional implementation details, reference may be made to the descriptions of FIG. 9.

The electronic device 100 according to an embodiment of the disclosure may update the first machine learning model and the second machine learning model based on the user feedback with respect to the first notification of the notification message (Operation S1460).

The electronic device 100 according to an embodiment of the disclosure may receive the user feedback that removes the notification of the notification message without confirming the notification of the notification message.

The electronic device 100 according to an embodiment of the disclosure may receive negative feedback from the user, indicating not to provide a notification of a message. The electronic device 100 may reflect the feedback in determining the priority of a similar notification message and the notification time of the notification message. For example, the electronic device 100 may update the first model so that the priority score of a similar notification message decreases.

The electronic device 100 according to an embodiment of the disclosure may receive feedback from the user, indicating that notification of the notification message is too late.

The electronic device 100 may reflect the feedback in determining the priority of a similar notification message and the notification time of the notification message. For example, the electronic device 100 may update the first model so that the priority score of the similar notification message increases.

According to an embodiment of the disclosure, the electronic device 100 may determine the notification time and notification method of the notification message by giving more weight to the priority of the notification message in determining the notification time and notification method of the notification message, based on the priority of the notification message and the predicted level of immersion.

The electronic device 100 according to an embodiment of the disclosure may update the first machine learning model and the second machine learning model based on the user feedback with respect to the first notification and information on the user's notification processing behavior after the notification.

The electronic device 100 according to an embodiment of the disclosure may update the first machine learning model and the second machine learning model based on the user feedback with respect to the first notification, information on the user's notification processing behavior after the notification, and changes in the usage patterns of the electronic device 100 and the external device 300.

According to an embodiment of the disclosure, the electronic device 100 may adjust parameters and rules of each model based on the user feedback, changes in the viewing environment of the electronic device 100, and changes in the usage patterns of the electronic device 100 and a smart device, for example, the external device 300, thereby continuously improving the user's TV watching experience.

Figure 15:
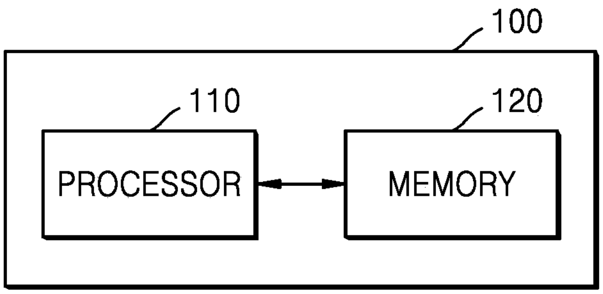
FIG. 15 is a block diagram of an electronic device according to an embodiment of the disclosure.

FIG. 15 is a block diagram of an electronic device 100 according to an embodiment of the disclosure.

Referring to FIG. 15, the electronic device 100 may include a processor 110 and a memory 120.

The memory 120 may store a program for processing and controlling by the processor 110. The memory 120 may store data that is input to the electronic device 100 or output from the electronic device 100.

The memory 120 may include at least one selected from an internal memory and an external memory.

The memory 120 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The internal memory may include, for example, at least one selected from volatile memory (for example, dynamic RAM (DRAM), static RAM (SRAM), or synchronous dynamic RAM (SDRAM)), non-volatile memory (for example, one time programmable ROM (OTPROM), programmable ROM (PROM), erasable and programmable ROM (EPROM), electrically erasable and programmable ROM (EEPROM), mask ROM, or flash ROM), a hard disk drive (HDD), and a solid state drive (SSD).

According to an embodiment of the disclosure, the processor 110 may load a command or data received from at least one of the non-volatile memory or another element into the volatile memory and process the command or the data. The processor 110 may store data received or generated from another element in the non-volatile memory.

The external memory may include, for example, at least one selected from Compact Flash (CF), Secure Digital (SD), Micro-SD, Mini-SD, extreme Digital (xD) and Memory Stick.

The memory 120 may store one or more instructions executable by the processor 110.

According to an embodiment of the disclosure, the memory 120 may store one or more instructions, which are executable by the processor 110, separately in a plurality of memories 120.

According to an embodiment of the disclosure, the memory 120 may store one or more instructions executable by at least one processor 110 individually or collectively.

According to an embodiment of the disclosure, the memory 120 may store various types of information that are received through an input/output interface.

According to an embodiment of the disclosure, at least one of instructions, an algorithm, a data structure, program code, or an application program readable by the processor 110 may be stored in the memory 120. The instructions, algorithm, data structure, and program code stored in the memory 120 may be implemented in, for example, programming or scripting languages such as C, C++, Java, assembler, and the like.

According to an embodiment of the disclosure, the memory 120 may store instructions for controlling the processor 110 to receive a notification message while first content is displayed, determine a third priority of the notification message by using a first machine learning model trained to output a determined priority of an input notification message based on a response history of a user with respect to one or more notification messages corresponding to the notification message, obtain a predicted level of immersion of the user with respect to the first content by obtaining first content information about the first content and inputting the first content information into a second machine learning model trained to obtain a predicted level of immersion of the user with respect to content being played based on input information about the content being played, determine a first notification time and a first notification method of the notification message based on the priority of the notification message and the predicted level of immersion, and triggering the first notification for the notification message according to the first notification time and the first notification method.

When there is an input of a user or stored preset conditions are satisfied, the processor 110 may execute an operating system (OS) and various applications that are stored in the memory 120.

The processor 110 may include random-access memory (RAM) that stores a signal or data input by an external source of the electronic device 100 or is used as a memory area for various operations performed by the electronic device 100, and read-only memory (ROM) that stores a control program for controlling the electronic device 100.

The processor 110 may include at least one processing circuit.

The processor 110 may include a single core, a dual core, a triple core, a quad core, or a multiple core thereof. The processor 110 may include a plurality of processors. For example, the processor 110 may be implemented by using a main processor and a sub-processor operating in a sleep mode.

The processor 110 may include at least one of a central processing unit (CPU), a graphics processing unit (GPU), or a video processing unit (VPU). According to an embodiment of the disclosure, the processor 110 may be implemented in the form of a system on chip (SOC) that integrates at least one of a CPU, a GPU, or a VPU.

The processor 110 may include various processing circuits and/or a plurality of processors. For example, the term "processor" as used herein and in the claims may include various processing circuits, including at least one processor. One or more processors in the at least one processor may be configured to perform various functions described herein, individually and/or collectively, in a distributed manner. As used herein, "processor," "at least one processor," and "one or more processors" may be configured to perform various functions. These terms may cover, for example but without limitation, a situation where one processor performs some of the functions and other processor(s) perform other parts of the functions, and a situation where a single processor may perform all of the functions. The at least one processor may include a combination of processors that perform various functions of the disclosed functions in a distributed manner. The at least one processor may execute program instructions to achieve or perform various functions.

The processor 110 may control various components of the electronic device 100 by executing one or more instructions stored in the memory 120.

According to an embodiment of the disclosure, the processor 110 may receive a notification message while the first content is displayed.

According to an embodiment of the disclosure, the processor 110 may determine the third priority of the notification message by using a first machine learning model trained to output a determined priority of an input notification message based on the response history of the user with respect to one or more notification messages corresponding to the notification message.

According to an embodiment of the disclosure, the processor 110 may obtain a predicted level of immersion with respect to the first content by obtaining first content information about the first content and inputting the first content information into a second machine learning model trained to obtain a predicted level of immersion of a user with respect to content being played based on input information about the content being played.

According to an embodiment of the disclosure, the processor 110 may determine a first notification time and a first notification method of the notification message based on the priority of the notification message and the predicted level of immersion, and may trigger the first notification for the notification message according to the first notification time and the first notification method.

According to an embodiment of the disclosure, the processor 110 may classify the received notification message, store the \ notification message without notification when the received notification message is classified as a first type, trigger the first notification at a first time when the predicted level of immersion is classified as low and the notification message is classified as a second type, and immediately notify the received notification message when the received notification message is classified as a third type.

According to an embodiment of the disclosure, the processor 110 may, when the received notification message is classified as the first type, combine the notification message with a previously stored message without notification based on the previously stored message being stored without notification to generate a first combined message, and store the first combined message, and combine the notification message with a previously stored combined message based on the previously stored combined message being stored without notification to generate a second combined message, and store the second combined message.

According to an embodiment of the disclosure, the processor 110 may, by executing one or more instructions, determine the first priority of the first combined message by using the first machine learning model when the first combined message is generated, determine a second notification time and a second notification method of the first combined message based on the first priority of the first combined message and the predicted level of immersion, and notify the first combined message according to the determined notification time and notification method.

According to an embodiment of the disclosure, the processor 110 may, by executing one or more instructions, update the first machine learning model and the second machine learning model based on the user feedback with respect to the first notification.

FIG. 16 is a detailed block diagram of an electronic device 100 according to an embodiment of the disclosure.

Referring to FIG. 16, the electronic device 100 may include a tuner 340, a processor 110, a display 320, a communication interface 350, a sensor 360, an input/output (I/O) interface 370, a video processor 380, an audio processor 385, an audio output interface 390, a memory 120, and a power supply 395.

The same configurations and operations as those described with reference to FIG. 15 are given the same drawing reference numerals as those described with reference to FIG. 15. Accordingly, for additional implementation details, reference may be made to the descriptions of FIG. 15.

The processor 110 of FIG. 16 corresponds to the processor 110 of FIG. 15, and the memory 120 of FIG. 16 corresponds to the memory 120 of FIG. 15. Accordingly, for additional implementation details, reference may be made to the descriptions of FIG. 15.

The communication interface 350 according to an embodiment of the disclosure may include a Wi-Fi module, a Bluetooth module, an infrared communication module, a wireless communication module, a LAN module, an Ethernet module, a wired communication module, and the like. Each of these communication module may be implemented in the form of at least one hardware chip.

The Wi-Fi module and the Bluetooth module may perform communication according to a Wi-Fi method and a Bluetooth method, respectively. When using a Wi-Fi module or a Bluetooth module, the communication interface 350 may first transmit or receive various types of connection information, such as a service set ID (SSID) and a session key, connect with various external devices by using the various types of connection information, and then transmit or receive various pieces of information. The wireless communication module may include at least one communication chip that performs communication according to various wireless communication standards, such as Zigbee, 3$^{rd}$ generation (3G), 3$^{rd}$ generation partnership project (3GPP), long term evolution (LTE), LTE advanced (LTE-A), 4th generation (4G), and 5th generation (5G).

The communication interface 350 according to an embodiment of the disclosure may receive a user input from an external device.

The communication interface 350 according to an embodiment of the disclosure may communicate with the external device, such as a server.

The communication interface 350 according to an embodiment of the disclosure may include a communication interface that performs wireless communication with a server, for example, such as Bluetooth (BT), and a communication interface that is connected to an external device through an HDMI port, for example. The communication interface that performs wireless communication with the server, for example, such as BT, may perform connection with other devices and transmission of video/audio data. The communication interface that is connected to an external device through an HDMI port, etc, may include not only an input port for receiving an input, but also an output port, such as a DP, an HDMI, an RGB, a DVI, or Thunderbolt, for transmitting a video or audio signal to an external display or a speaker.

The tuner 340 according to an embodiment of the disclosure may tune and select only a frequency of a channel which the electronic device 100 wants to receive from among many radio wave components via amplification, mixing, resonance, or the like of a wired or wireless broadcasting signal. The broadcasting signal includes audio, video, and additional information (for example, an EPG).

The tuner 340 may receive a broadcasting signal from various sources, such as terrestrial broadcasting, cable broadcasting, satellite broadcasting, and Internet broadcasting. The tuner 340 may also receive a broadcasting signal from a source such as analog broadcasting or digital broadcasting.

The sensor 360 may sense a voice of the surroundings of the electronic device 100, an image of the surroundings of the electronic device 100, or an interaction with the surroundings of the electronic device 100, and may include at least one of a microphone 331, a camera 332, or a light receiver 333. The sensor 360 may sense a state of the electronic device 100 or a state of the surrounding of the electronic device 100 and may transmit information corresponding to the sensed state to the processor 110.

The microphone 331 receives an uttered voice of a user and a voice generated from the surrounding of the electronic device 100. The microphone 331 may transform the received voice into an electrical signal and output the electrical signal to the processor 110. The microphone 331 may use various noise removal algorithms in order to remove noise that is generated while receiving an external audio signal.

The camera 332 may obtain an image frame, such as a still image or a moving picture. An image captured via the image sensor may be processed by the processor 110 or a separate image processor.

The image frame obtained by the camera 332 may be stored in the memory 120 or transmitted to the outside via the communication interface 350. At least two cameras 332 may be included according to embodiments of the electronic device 100.

The light receiver 333 receives an optical signal (including a control signal) from an external remote control device. The light receiver 333 may receive an optical signal corresponding to a user input (for example, touch, pressing, a touch gesture, a voice, or a motion) from the remote control device. A control signal may be extracted from the received optical signal under the control by the processor 110. For example, the light receiver 333 may receive a control signal corresponding to a channel up/down button for channel switching from the remote control device.

The sensor 360 is illustrated as including the microphone 331, the camera 332, and the light receiver 333, but is not limited thereto, and may include at least one selected from a magnetic sensor, an acceleration sensor, a temperature/humidity sensor, an infrared sensor, a gyroscope sensor, a position sensor (e.g., a global positioning system (GPS)), a pressure sensor, a proximity sensor, an RGB sensor, an illuminance sensor, or a Wi-Fi signal receiver.

The sensor 360 is illustrated as being included in the electronic device 100, but is not limited thereto, and may be included in a control device that is located independently of the electronic device 100 and communicates with the electronic device 100, such as a remote controller. When the sensor 130 is included in a control device of the electronic device 100, the control device may digitize information sensed by the sensor 130 and transmit the digitized information to the electronic device 100. The control device may communicate with the electronic device 100 via short-range communication including infrared, Wi-Fi, or Bluetooth.

For example, a microphone may be included in the electronic device 100, but may be included in a control device that is located independently of the electronic device 100 and communicates with the electronic device 100, such as a remote controller.

According to an embodiment of the disclosure, when a microphone is included in a remote controller, an analog audio signal may be received through the microphone, and the remote controller may digitize the analog audio signal and transmit the digitized analog audio signal to the electronic device 100, such as a TV. The remote controller may communicate with the electronic device 100 via short-range communication including infrared, Wi-Fi or Bluetooth (BT).

According to an embodiment of the disclosure, the electronic device 100 may include a plurality of communication interfaces 350 capable of various short-range communications including infrared, Wi-Fi, or Bluetooth.

According to an embodiment of the disclosure, the electronic device 100 may include the plurality of communication interfaces 350 in which a communication interface communicating with the server 200 and a communication interface communicating with a remote controller are different from each other. For example, the communication interface that communicates with the server 200 may be a communication interface that uses an Ethernet modem, a Wi-Fi module, or the like, while the communication interface that communicates with a remote controller may be a communication interface that uses a BT module.

According to an embodiment of the disclosure, the electronic device 100 may include a communication interface 350 in which a communication interface communicating with the server 200 and a communication interface communicating with a remote controller are the same as each other. For example, the communication interface that communicates with the server 200 and the communication interface that communicates with the remote controller may be both communication interfaces that use a WiFi module.

According to an embodiment of the disclosure, a device, such as a smartphone, in which a remote control application is provided may perform the same role as the remote controller. The device in which a remote control application is provided may control the electronic device 100, and may perform a voice recognition function.

The device in which a remote control application may be provided may be any device capable of providing and operating an application, such as an AI speaker, other than a smartphone.

According to an embodiment of the disclosure, the device in which a remote control application is provided may perform user voice reception.

According to an embodiment of the disclosure, the electronic device 100 may transmit and receive data to and from the device on which the remote control or remote control application may be installed, by using Wi-Fi, BT, or infrared, for example, and may include a plurality of communication interfaces capable of implementing the above-described communication method so that the device on which the remote control or a remote control application may be installed may be controlled.

The I/O interface 370 receives video (for example, a moving picture), audio (for example, a voice or music), and additional information (for example, an EPG) from outside the electronic device 100 under the control by the processor 110. The I/O interface 370 may include a high-definition multimedia interface (HDMI), a mobile high-definition link (MHL), a universal serial bus (USB), a display port (DP), a thunderbolt, a video graphics array (VGA) port, an RGB port, a D-subminiature (D-SUB), a digital visual interface (DVI), a component jack, or a PC port.

The video processor 380 processes video data that is received by the electronic device 100. The video processor 380 may perform a variety of image processing, such as decoding, scaling, noise removal, frame rate transformation, and resolution transformation, on the received video data.

The display 320 generates a driving signal by converting an image signal, a data signal, an on-screen display (OSD) signal, and a control signal that are processed by the processor 110. The display 320 may be a plasma display panel (PDP), a liquid-crystal display (LCD), an organic light-emitting device (OLED), a flexible display, or a 3-dimensional (3D) display. The display 320 may be configured as a touch screen, and thus may serve as an input device as well as an output device.

The display 320 may output various contents that are input via the communication interface or the I/O interface 370, or may output an image stored in the memory 120. The display 320 may also output, to a screen, information input by the user through the I/O interface 370.

The display 320 may include a display panel. The display panel may be a liquid crystal display (LCD) panel or a panel including various illuminators such as a light-emitting diode (LED), an organic light-emitting diode (OLED), and a cold cathode fluorescent lamp (CCFL). The display panel may include not only a flat display device but also a curved display device having a curvature or a flexible display device capable of adjusting a curvature. The display panel may be a 3D display or an electrophoretic display.

An output resolution of the display panel may be, for example, a high definition (HD), a full HD, an ultra HD, or a resolution that is clearer than an ultra HD.

In the embodiment of FIG. 16, the electronic device 100 is illustrated as including a display, but is not limited thereto. The electronic device 100 may be configured to transmit a video/audio signal to a separate display device including a display by being connected to the separate display device via wire/wireless communication.

According to an embodiment of the disclosure, the electronic device 100 may be implemented in a form that operates by being connected to an external display even when the electronic device 100 does not have a display.

For example, the electronic device 100 may be implemented as a type that outputs an image to a separate external display via a video or audio output port, without a display, like an STB and an apple TV, or with a simple display for notifications, for example.

The electronic device 100 may include an output port for outputting a video or audio signal to a display. The output port may be of a type capable of transmitting a video signal and an audio signal such as an HDMI, a DP, or a thunderbolt, or may be of a type having separate ports that transmit a video signal and an audio signal separately.

According to an embodiment of the disclosure, the electronic device 100 may transmit a video or audio signal via wired or wireless communication.

The audio processor 385 processes audio data. The audio processor 385 may perform a variety of processing, such as decoding, amplification, or noise removal, on the audio data. The audio processor 385 may include a plurality of audio processing modules to process audios corresponding to a plurality of pieces of content.

The audio output interface 390 outputs audio included in a broadcasting signal received via the tuner 340, under a control by the processor 110. The audio output interface 390 may output audio (for example, a voice or a sound) that is input via the communication interface 350 or the I/O interface 370. The audio output interface 390 may also output audio stored in the memory 120 under a control by the processor 110. The audio output interface 390 may include at least one of a speaker, a headphone output port, or a Sony/Philips digital interface (S/PDIF) output port.

The power supply 395 supplies power that is input from an external power source, to the internal components of the electronic device 100, under the control of the processor 110. The power supply 395 may also supply power that is output by one or more batteries located in the electronic device 100, to the internal components of the electronic device 100, under the control by the processor 110.

The memory 120 may store various data, programs, or applications for driving and controlling the electronic device 100 under a control by the processor 110. The memory 120 may include a broadcasting receiving module, a channel control module, a volume control module, a communication control module, a voice recognition module, a motion recognition module, a light receiving module, a display control module, an audio control module, an external input control module, a power control module, a power control module of a wirelessly (for example, Bluetooth) connected external device, a voice database (DB), or a motion DB, which are not shown. These modules and the DBs of the memory 120, which are not shown, may be implemented as software in order to perform a broadcasting reception control function, a channel control function, a volume control function, a communication control function, a voice recognition function, a motion recognition function, a light receiving control function, a display control function, an audio control function, an external input control function, a power control function, or a power control function of the wirelessly (for example, Bluetooth) connected external device in the electronic device 100. The processor 110 may perform these functions by using the software stored in the memory 120.

The processor 110 is illustrated as a single element in FIG. 16, but embodiments of the disclosure are not limited thereto. According to an embodiment, the processor 110 may be provided as one or in plurality.

According to an embodiment of the disclosure, the processor 110 may be configured as a dedicated hardware chip that performs artificial intelligence (AI) learning.

A module included in the memory 120 denotes a unit processing a function or operation performed by the processor 110, and may be implemented as software, such as instructions, algorithm, data structure, or program code.

The block diagrams of the electronic device 100 shown in FIGS. 15 and 16 are only exemplary embodiments. Components illustrated in FIGS. 15 and 16 may be combined according to the specifications of the electronic device 100 when being actually implemented, or additional components may be included in the block diagrams of FIGS. 15 and 16. Two or more components may be combined into a single component, or a single component may be divided into two or more components. A function performed in each block is an example to explain embodiments of the disclosure, and a detailed operation or device of each block does not limit the scope of the embodiments.

Figure 17:
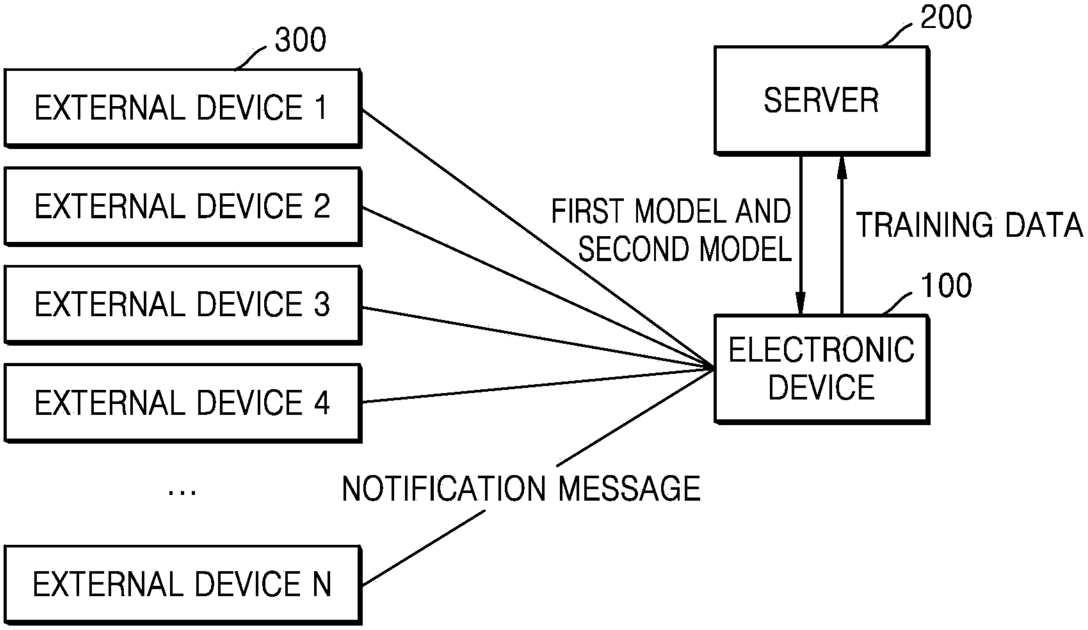
FIG. 17 is a diagram showing an example of a structure in which an electronic device according to an embodiment of the disclosure operates using a server.
Figure 18:
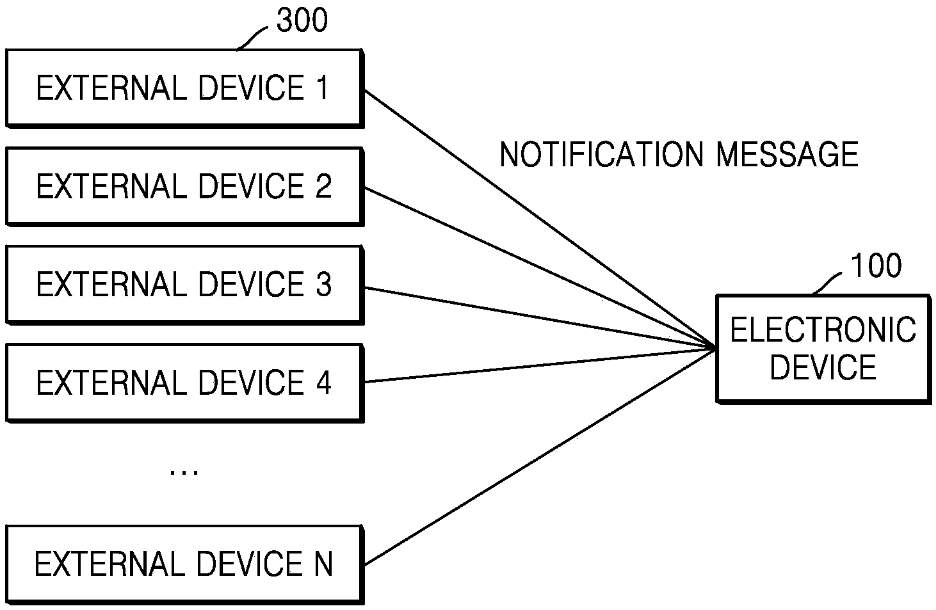
FIG. 18 is a diagram showing an example of a structure in which an electronic device according to an embodiment of the disclosure operates using on-device AI.

FIG. 17 is a diagram showing an example of a structure in which an electronic device according to an embodiment of the disclosure operates using a server, and FIG. 18 is a diagram showing an example of a structure in which an electronic device according to an embodiment of the disclosure operates using on-device AI.

The electronic device 100 according to the embodiment of FIG. 12 may obtain from the server 200 a first machine learning model trained to output the determined priority of an input notification message based on a response history of a user with respect to one or more notification messages corresponding to the notification message and a second machine learning model trained to obtain a predicted level of immersion of a user with respect to content being played based on input information about the content being played.

The electronic device 100 according to the embodiment of FIG. 12 may determine the priority of a notification message received from at least one external device 300 by using the first machine learning model.

The electronic device 100 according to the embodiment of FIG. 12 may obtain a predicted level of immersion of a user with respect to the content being played by using the second machine learning model.

The electronic device 100 according to the embodiment of FIG. 12 may determine the notification time and notification method of the notification message received from at least one external device 300 based on the priority of the notification message determined using the first machine learning model and the user's level of immersion predicted using the second machine learning model.

According to an embodiment of the disclosure, the server 200 may generate and update the first machine learning model by obtaining and learning the response history of a user with respect to one or more notification messages corresponding to a notification message received during content playback from a plurality of electronic devices.

According to an embodiment of the disclosure, the server 200 may update the first machine learning model by reflecting the user feedback with respect to the first notification of the notification message received during content playback.

According to an embodiment of the disclosure, the server 200 may generate and update the second machine learning model by performing learning to predict the level of immersion of the user with respect to each content by obtaining information about the content from a plurality of electronic devices.

According to an embodiment of the disclosure, the information about the content may include history information about the response history of the user with respect to the notification message while viewing similar content. For example, when the response rate of the user to a notification message is classified as high while watching the news and the response rate of the user to a similar notification message is classified as low while watching a drama, the electronic device 100 may predict that the user's level of immersion with respect to the drama is higher than that in the news.

According to an embodiment of the disclosure, the electronic device 100 may provide the server with all types of information about what content of the notification message is received from what devices or applications while what content is being played, and how the user reacts to the received notification messages. According to an embodiment of the disclosure, the electronic device 100 may identify the user based on a user account.

According to an embodiment of the disclosure, the electronic device 100 may perform a separate procedure, such as encrypting or deleting content corresponding to personal information when providing information to the server 200 to protect the personal information.

The server 200 may train the first machine learning model and the second machine learning model based on the information received from the electronic device 100.

According to an embodiment of the disclosure, the electronic device 100 may receive periodically or in real time the first machine learning model and the second machine learning model from the server 200 to update the existing first machine learning model and second machine learning model.

The electronic device 100 according to the embodiment of FIG. 18 may directly perform the role performed by the server 200 of FIG. 17.

The electronic device 100 according to an embodiment of the disclosure may train and update the first machine learning model and the second machine learning model periodically or in real time.

The electronic device 100 according to an embodiment of the disclosure may train and update the first machine learning model and the second machine learning model by reflecting in real time the response information of the user on the received notification message and the feedback with respect to the triggered notification message.

According to an embodiment of the disclosure, the electronic device 100 may train and update the first machine learning model and the second machine learning model by reflecting in real time or periodically the information about what content of the notification message is received from what device or application while what content is being played and how the user reacts the received notification message.

An operating method of the electronic device 100 according to an embodiment of the disclosure may be embodied as a computer-readable medium including instructions executable by a computer such as a program module executable by the computer. The computer-readable medium may be any available media accessible by a computer and includes both volatile and nonvolatile media and removable and non-removable media. The computer-readable medium may include program commands, data files, data structures, and the like separately or in combinations. The program commands to be recorded on the computer-readable medium may be designed and configured for the present disclosure or may be well-known to and usable by one of ordinary skill in the art of computer software. Examples of a computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device configured to store and execute program commands such as a ROM, a random-access memory (RAM), or a flash memory. Examples of the program commands may include high-level language codes that can be executed by a computer by using an interpreter or the like as well as machine language codes made by a compiler.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

Although the examples of the disclosure have been disclosed for illustrative purposes, one of ordinary skill in the art will appreciate that diverse variations and modifications are possible, without departing from the spirit and scope of the disclosure. The above embodiments should be understood not to be restrictive but to be illustrative, in all aspects. For example, each component described as a single type may be implemented in a distributed manner, and components described as being distributed may be implemented in a combined form.

An electronic device according to an embodiment of the disclosure may include at least one processor including a processing circuit, and a memory storing one or more instructions, wherein the one or more instructions, when executed by the at least one processor individually or collectively, may cause the electronic device to receive a notification message while first content is displayed, receive a notification message while first content is displayed, determine a third priority of the notification message by using a first machine learning model trained to output a determined priority of an input notification message based on a response history of a user with respect to one or more notification messages corresponding to the notification message, predict the user's level of immersion with respect to the first content by obtaining first content information about the first content and inputting the first content information into a second machine learning model trained to obtain a predicted level of immersion of a user with respect to content being played based on input information about the content being played, determine a first notification time and a first notification method of the notification message based on the priority of the notification message and the predicted level of immersion, and trigger the first notification for the first notification for the notification message according to the first notification time and the first notification method.

The one or more instructions, when executed by the at least one processor individually or collectively, may cause the electronic device to classify the notification message, store the notification message without notification when the notification message is classified as a first type, trigger the first notification at a first time when the predicted level of immersion is classified as low and the notification message is classified as a second type, and immediately trigger the first notification when the notification message is classified as a third type.

The electronic device may be further configured to: when the received notification message is classified as the first type, combine the notification message with a previously stored message without notification based on the previously stored message being stored without notification to generate a first combined message, and store the first combined message, and combine the notification message with a previously stored combined message based on the previously stored combined message being stored without notification to generate a second combined message, and store the second combined messaged.

A second priority of the second combined message may be greater than or equal to a first priority of the first combined message, and the first priority of the first combined message may be greater than or equal to the third priority of the notification message.

The electronic device may be further configured to: determine the first priority of the first combined message by using the first machine learning model when the first combined message is generated, determine a second notification time and a second notification method of the first combined message based on the determined first priority of the first combined message and the predicted level of immersion, and notify the first combined message according to the determined notification time and notification method.

The one or more instructions, when executed by the at least one processor individually or collectively, may cause the electronic device to update both the first machine learning model and the second machine learning model based on the user feedback with respect to the first notification of the notification message.

The first machine learning model and the second machine learning model may be trained on a server.

The notification method may include at least one of combining a plurality of notification messages and triggering a single message notification, triggering a pop-up notification, triggering a text bar notification, storing a notification message without notification, triggering a voice output notification, or requesting feedback from the user based on triggering a notification.

The second machine learning model may be a model trained to obtain a predicted level of a user's immersion with respect to content based on input information about the content and context information of the content user, and the electronic device may obtain a predicted level of immersion of the user with respect to the first content by obtaining first content information about the first content and first context information of the user and inputting the first content information and the context information of the user into the second machine learning model.

The first content information may include at least one of type information, genre information, motion analysis information, color analysis information, running time information, or the user's playback information.

A method of operating an electronic device, according to an embodiment of the disclosure, may include receiving a notification message while first content is displayed, determining a third priority of the notification message by using a first machine learning model trained to output a determined priority of an input notification message based on a response history of a user with respect to one or more notification messages corresponding to the notification message, obtaining a predicted level of immersion of the user with respect to the first content by obtaining first content information about the first content and inputting the first content information into a second machine learning model trained to obtain a predicted level of immersion of a user with respect to content being played based on input information about the content being played, determining a first notification time and a first notification method of the notification message based on the priority of the notification message and the predicted level of immersion, and triggering a first notification for the notification message according to the first notification time and the first notification method.

The determining of the notification time and the notification method of the notification message may include classifying the notification message, storing the received notification message without notification when the notification message is classified as a first type, triggering the first notification at a first time when the predicted level of immersion is classified as low and the notification message is classified as a second type, and immediately triggering the first notification when the received notification message is classified as a third type.

The method may further include: when the received notification message is classified as the first type, combining the notification message with a previously stored message without notification based on the previously stored message being stored without notification to generate a first combined message, and storing the first combined message, and combining the notification message with a previously stored combined message based on the previously stored combined message being stored without notification to generate a second combined message, and storing the second combined message.

A second priority of the second combined message may be greater than or equal to a first priority of the first combined message, and the first priority of the first combined message may be greater than or equal to the third priority of the notification message.

The method may further include: determining the first priority of the first combined message by using the first machine learning model when the first combined message is generated; determining a second notification time and a second notification method of the first combined message based on the first priority of the first combined message and the predicted level of immersion; and notifying the first combined message according to the determined notification time and notification method.

The method may further include updating the first machine learning model and the second machine learning model based on the user feedback with respect to the first notification.

The first machine learning model and the second machine learning model may be trained on a server.

The notification method may include at least one of combining a plurality of notification messages and triggering a single message notification, triggering a pop-up notification, triggering a text bar notification, storing a notification message without notification, triggering a voice output notification, or requesting feedback from the user based on triggering a notification.

The second machine learning model may be a model trained to obtain a predicted level of immersion of a user with respect to content based on input information about the content and context information of the content user, and the method may further include obtaining a predicted level of immersion of the user with respect to the first content by obtaining first content information about the first content and first context information of the user and inputting the first content information and the context information of the user into the second learning machine model.

A non-transitory computer-readable recording medium having recorded thereon a computer program, which, when executed by a computer, performs the method of operating an electronic device, may be provided.

What is claimed is:

1. An electronic device comprising:
at least one processor; and
memory storing one or more instructions,
wherein the one or more instructions, when executed by the at least one processor individually or collectively, cause the electronic device to:
receive a notification message while first content is displayed;
determine a priority of the notification message by using a first machine learning model trained to output a determined priority of an input notification message based on a response history of a user with respect to one or more notification messages corresponding to the input notification message;
obtain a predicted level of immersion of the user with respect to the first content by obtaining first content information about the first content and inputting the first content information into a second machine learning model trained to obtain a predicted level of immersion of the user with respect to content being played based on input information about content being played;

determine a first notification time and a first notification method of the notification message based on the priority and the predicted level of immersion; and trigger a first notification for the notification message according to the first notification time and the first notification method.

2. The electronic device of claim 1, wherein the one or more instructions, when executed by the at least one processor individually or collectively, cause the electronic device to:

classify the notification message;

store the notification message without notification based on the notification message being classified as a first type;

trigger the first notification at a first time based on the predicted level of immersion being classified as a low and the notification message being classified as a second type; and trigger the first notification based on the notification message being classified as a third type.

3. The electronic device of claim 2, wherein the notification message is classified as the first type, and wherein the one or more instructions, when executed by the at least one processor individually or collectively, cause the electronic device to:

combine the notification message with a previously stored message without notification based on the previously stored message being stored without notification to generate a first combined message, and store the first combined message; and combine the notification message with a previously stored combined message based on the previously stored combined message being stored without notification to generate a second combined message, and store the second combined message.

4. The electronic device of claim 3, wherein a second priority of the second combined message is greater than or equal to a first priority of the first combined message, and the first priority is greater than or equal to a third priority of the notification message.

5. The electronic device of claim 4, wherein the one or more instructions, when executed by the at least one processor individually or collectively, cause the electronic device to:

determine the first priority by using the first machine learning model based on the first combined message being generated;

determine a second notification time and a second notification method of the first combined message based on the first priority and the predicted level of immersion; and trigger a second notification for the first combined message based on the second notification time and the second notification method.

6. The electronic device of claim 1, wherein the one or more instructions, when executed by the at least one processor individually or collectively, cause the electronic device to update both the first machine learning model and the second machine learning model based on user feedback with respect to the first notification.

7. The electronic device of claim 1, wherein both the first machine learning model and the second machine learning model are trained on a server.

8. The electronic device of claim 1, wherein the first notification method comprises at least one of:

combining a plurality of notification messages and triggering a single message notification, triggering a pop-up notification, triggering a text bar notification, storing a notification message without notification, triggering a voice output notification, or requesting feedback from the user based on triggering a notification.

9. The electronic device of claim 1, wherein the second machine learning model is trained to predict a level of immersion with respect to content based on input information about the content and context information of the user, wherein the one or more instructions, when executed by the at least one processor individually or collectively, cause the electronic device to obtain the predicted level of immersion based on obtaining the first content information and first context information of the user, and inputting the first content information and the first context information into the second machine learning model.

10. The electronic device of claim 1, wherein the first content information comprises at least one of type information, genre information, motion analysis information, color analysis information, running time information, or playback information of the user.

11. An operating method of an electronic device comprising:

receiving a notification message while first content is displayed;

determining a priority of the notification message by using a first machine learning model trained to output a determined priority of an input notification message based on a response history of a user with respect to one or more notification messages corresponding to the input notification message;

obtaining a predicted level of immersion of the user with respect to the first content by obtaining first content information about the first content and inputting the first content information into a second machine learning model trained to obtain a predicted level of immersion of the user with respect to content being played based on input information about content being played;

determining a first notification time and a first notification method of the notification message based on the priority and the predicted level of immersion; and triggering a first notification for the notification message according to the first notification time and the first notification method.

12. The operating method of claim 11, wherein the determining of the notification time and the notification method of the notification message comprises:

classifying the notification message;

storing the notification message without notification based on the notification message being classified as a first type;

triggering the first notification at a first time based on the predicted level of immersion being classified as low and the notification message being classified as a second type; and triggering the first notification based on the notification message being classified as a third type.

13. The operating method of claim 12, wherein the notification message is classified as the first type, and wherein the storing the notification message comprises:

combining the notification message with a previously stored message without notification based on the previously stored message being stored without notification to generate a first combined message, and storing the first combined message; and combining the notification message with a previously stored combined message based on the previously stored combined message being stored without notification to generate a second combined message, and storing the second combined message.

14. The operating method of claim 13, wherein a second priority of the second combined message is greater than or equal to a first priority of the first combined message, and the first priority is greater than or equal to a third priority of the notification message.

15. The operating method of claim 14, further comprising:

determining the first priority by using the first machine learning model based on the first combined message being generated;

determining a second notification time and a second notification method of the first combined message based on the first priority and the predicted level of immersion; and triggering a second notification for the first combined message based on the second notification time and the second notification method.

16. The operating method of claim 11, further comprising updating both the first machine learning model and the second machine learning model based on user feedback with respect to the first notification.

17. The operating method of claim 11, wherein both the first machine learning model and the second machine learning model are trained on a server.

18. The operating method of claim 11, wherein the first notification method comprises at least one of:

combining a plurality of notification messages and triggering a single message notification, triggering a pop-up notification, triggering a text bar notification, storing the notification message without notification, triggering a voice output notification, or requesting feedback from the user based on triggering a notification.

19. The operating method of claim 11, wherein the second machine learning model is trained to predict a level of immersion with respect to content based on input information about the content and context information of the user, and wherein the operating method further comprises obtaining the predicted level of immersion based on obtaining the first content information and first context information of the user and inputting the first content information and the first context information into the second machine learning model.

20. A non-transitory computer-readable recording medium having instructions recorded thereon, that, when executed by one or more processors, individually or collectively, cause the one or more processors to:

receive a notification message while first content is displayed;

determine a priority of the notification message by using a first machine learning model trained to output a determined priority of an input notification message based on a response history of a user with respect to one or more notification messages corresponding to the input notification message;

obtain a predicted level of immersion of the user with respect to the first content by obtaining first content information about the first content and inputting the first content information into a second machine learning model trained to obtain a predicted level of immersion of the user with respect to content being played based on input information about content being played;

determine a first notification time and a first notification method of the notification message based on the priority and the predicted level of immersion; and trigger a first notification for the notification message according to the first notification time and the first notification method.

* * * * *